United States Patent
Huang et al.

(10) Patent No.: US 11,807,560 B2
(45) Date of Patent: Nov. 7, 2023

(54) WATER TREATMENT SYSTEM

(71) Applicant: Intex Marketing Ltd., Tortola (VG)

(72) Inventors: Zhi Xiong Huang, Fujian (CN);
Yonggui Chen, Fujian (CN); Yaw Yuan Hsu, Fujian (CN); Peilin Chen, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 17/463,064

(22) Filed: Aug. 31, 2021

(65) Prior Publication Data
US 2021/0395118 A1 Dec. 23, 2021

Related U.S. Application Data

(62) Division of application No. 16/498,919, filed as application No. PCT/IB2018/052242 on Mar. 31, 2018, now Pat. No. 11,274,052.

(30) Foreign Application Priority Data

Apr. 1, 2017 (CN) .......................... 201720341325.5
Apr. 1, 2017 (CN) .......................... 201720341531.6
(Continued)

(51) Int. Cl.
*C02F 1/78* (2023.01)
*C02F 1/467* (2023.01)
*C02F 103/42* (2006.01)

(52) U.S. Cl.
CPC .............. *C02F 1/78* (2013.01); *C02F 1/4674* (2013.01); *C02F 2103/42* (2013.01);
(Continued)

(58) Field of Classification Search
CPC ...... C02F 1/46; C02F 1/32; C02F 1/78; C25B 1/26
See application file for complete search history.

(56) References Cited

U.S. PATENT DOCUMENTS 4,100,052 A 7/1978 Stillman
4,790,923 A 12/1988 Stillman
(Continued)

FOREIGN PATENT DOCUMENTS

CN 201121150 Y 9/2008
CN 101484613 A 7/2009
(Continued)

OTHER PUBLICATIONS

International Preliminary Report on Patentability received for PCT Patent Application No. PCT/IB2020/053573, dated Oct. 28, 2021, 7 pages.
(Continued)

*Primary Examiner* — Walter D. Griffin
*Assistant Examiner* — Cameron J Allen
(74) *Attorney, Agent, or Firm* — Faegre Drinker Biddle & Reath LLP

(57) ABSTRACT

A water treatment system includes an ozone generator combined with an electrolytic chlorine generator in a compact, efficient and serviceable assembly. The system may include a modular and replaceable ozone generator, which allows a damaged or non-functional ozone generator to be quickly and efficiently replaced. In order to protect the ozone generator from damage, a fail-safe drain valve assembly may also be provided which will expel backflowing pool water before it is allowed to backflow into the ozone generator. The water treatment system may further include an insulated electrolytic chlorine generator that mitigates or eliminates current leakage for efficient operation.

20 Claims, 22 Drawing Sheets

(30) Foreign Application Priority Data

| Apr. 1, 2017 | (CN) | 201720344145.2 |
| Nov. 10, 2017 | (CN) | 201721500831.0 |
| Nov. 16, 2017 | (CN) | 201721531399.1 |

(52) U.S. Cl.
CPC .. *C02F 2201/004* (2013.01); *C02F 2201/005* (2013.01); *C02F 2201/007* (2013.01); *C02F 2201/782* (2013.01); *C02F 2201/784* (2013.01)

(56) References Cited

U.S. PATENT DOCUMENTS

| 5,807,473 | A | 9/1998 | Sadler |
| 6,277,288 | B1 | 8/2001 | Gargas |
| 7,329,343 | B1 | 2/2008 | Barnes |
| 8,608,914 | B2 | 12/2013 | Shimamune et al. |
| 11,274,052 | B2 | 3/2022 | Huang et al. |
| 2001/0050258 | A1 | 12/2001 | Gargas |
| 2004/0149663 | A1 | 8/2004 | Nakanishi |
| 2006/0027463 | A1* | 2/2006 | Lavelle ............... C02F 1/78 |
| | | | 205/556 |
| 2011/0010835 | A1 | 1/2011 | McCague |
| 2011/0173799 | A1 | 7/2011 | Wu et al. |
| 2017/0036926 | A1 | 2/2017 | Wilson |
| 2017/0253980 | A1 | 9/2017 | Matsubara et al. |
| 2021/0087085 | A1 | 3/2021 | Huang et al. |
| 2021/0395119 | A1 | 12/2021 | Huang et al. |
| 2022/0220013 | A1 | 7/2022 | Huang et al. |

FOREIGN PATENT DOCUMENTS

| CN | 101993135 A | 3/2011 |
| CN | 102002723 A | 4/2011 |
| CN | 201818845 U | 5/2011 |
| CN | 103964586 A | 8/2014 |
| CN | 104326608 | 9/2016 |
| CN | 106995229 A | 8/2017 |
| CN | 206708513 U | 12/2017 |
| CN | 206814465 U | 12/2017 |
| CN | 206828097 U | 1/2018 |
| CN | 207525022 U | 6/2018 |
| CN | 208440333 U | 1/2019 |
| CN | 209974383 U | 1/2020 |
| EP | 2767513 A1 | 8/2014 |
| WO | 03/40038 A2 | 5/2003 |
| WO | 2016/183666 A1 | 11/2016 |

OTHER PUBLICATIONS

International Search Report and Written Opinion received for PCT Patent Application No. PCT/IB2020/053573, dated Jul. 24, 2020, 10 pages.

International Preliminary Report on Patentability received for PCT Patent Application No. PCT/IB2018/052242, dated Oct. 10, 2019, 8 pages.

International Search Report and Written Opinion issued by the State Intellectual Property Office of the P.R.I China, dated Jul. 20, 2018, for International Application No. PCT/IB2018/052242; 11 pages.

Non-Final Office Action, issued by the U.S. Patent and Trademark Office, dated Dec. 23, 2022, for U.S. Appl. No. 17/463,081; 5 pages.

Response to Non-Final Office Action, filed with the U.S. Patent and Trademark Office, dated Mar. 20, 2023, for U.S. Appl. No. 17/463,081; 9 pages.

European Search Report as issued by the European Patent Office, dated Oct. 28, 2022, for European Patent Application No. 20791310.4; 18 pages.

\* cited by examiner

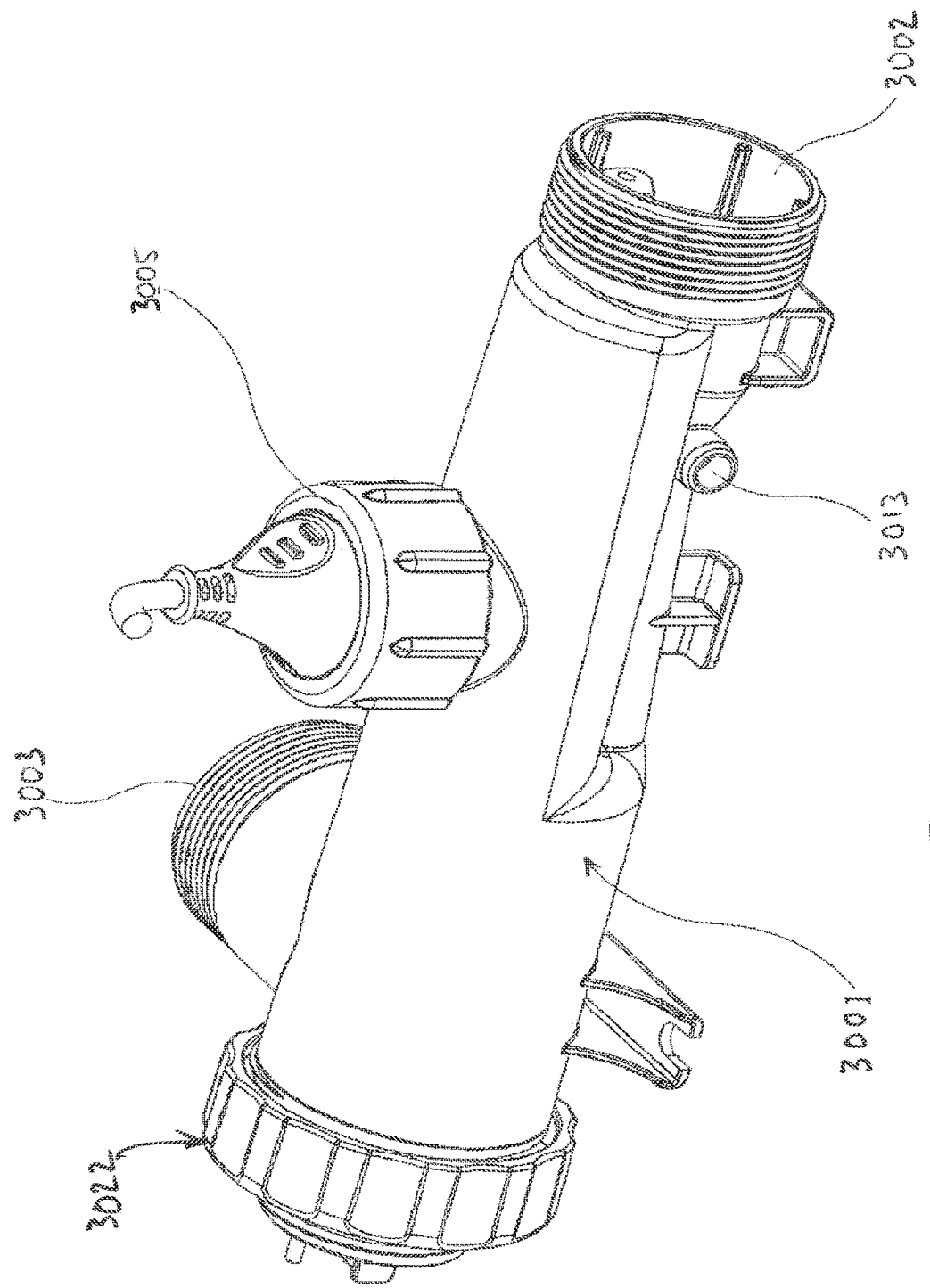

WATER TREATMENT SYSTEM

CROSS REFERENCE TO RELATED APPLICATIONS

This application is a divisional application of U.S. patent application Ser. No. 16/498,919, filed Sep. 27, 2019, which is a national stage of PCT/I132018/052242, filed Mar. 31, 2018, which is an International Patent Application claiming priority from each of the following Chinese priority applications:

| Chinese Application No. | Filing Date |
|---|---|
| CN 201720344145.2 | Apr. 1, 2017 |
| CN 201720341531.6 | Apr. 1, 2017 |
| CN 201720341325.5 | Apr. 1, 2017 |
| CN 201721531399.1 | Nov. 16, 2017 |
| CN 201721500831.0 | Nov. 10, 2017, | the entire disclosures of which are all hereby expressly incorporated herein by reference.

BACKGROUND

1. Field of the Disclosure

The present disclosure relates to a water treatment system which can be used with a pool for water disinfection.

2. Description of the Related Art

Ozone is a strong disinfectant, so ozone technology has been widely used in various contexts. For example, ozone may be used to disinfect the water in swimming pools, hot tubs, spas and the like. Ozone, because of its small size, can rapidly spread and penetrate bacteria, spores, and viruses in water, and effectively and efficiently oxidizes and destroys various tissue substances of bacteria, viruses, and algae. In addition, ozone does not have a strong odor, which can play a role in improving water quality in terms of taste, smell, and color. In commercial applications, ozone is generated by an ozone generator and connected to a swimming pool.

Specialized ozone generators designed for placement below the water level. During periods when the ozone generator is not generating ozone for disinfection, a one-way check valve or solenoid may be used to seal the generator intake to prevent backflow of swimming pool water toward the ozone generator. Such a valve protects the ozone generation element, because a valve failure can lead to damage of the ozone generator. One example of an existing "one-way ozone gas check valve device" can be found in Chinese Patent No. CN201818845U.

An ozone generator's service life is also affected by ambient service conditions, including the humidity of the working environment, the prevalence of dust or other particular matter, and other factors. Because pool areas can be demanding work environments for ozone generators, pool disinfection units may have regular maintenance needs. In many cases, maintenance is performed by a manufacturer such that the ozone generator must be taken out of service, sent to an offsite location, repaired and returned to service at the service site.

In addition to ozone, sodium hypochlorite may be used as a disinfectant for pools, spas and the like. It dissolves in water and can destroy the cell wall and cell membrane of cells, and then destroy DNA through the cell membrane to achieve sterilization. In typical applications, sodium hypochlorite is generated by an electrolytic chlorine generator, which is connected to a swimming pool through a water pipe for disinfection of the water. In commercial applications, sodium hypochlorite and ozone may be used together to sterilize the pool water of a swimming pool. For example, separate pipelines may connect sodium hypochlorite and ozone generators to the pool water for disinfection.

For electrolytic chlorine generators using side-by-side electrode plates, slowly moving edge bubbles may be produced on the edge of the electrode plates during electrolysis due to the fact that some edges of the electrode plates are exposed in the salt water, leading to the conduction between the edges of adjacent electrode plates and forming a leakage current that is not involved in the electrolysis. This leaked current represents a loss of electrolysis capacity and can result in low electrolysis efficiency.

SUMMARY

The present disclosure provides a water treatment system which includes an ozone generator combined with an electrolytic chlorine generator in a compact, efficient and serviceable assembly. The system may include a modular and replaceable ozone generator, which allows a damaged or non-functional ozone generator to be quickly and efficiently replaced. In order to protect the ozone generator from damage, a fail-safe drain valve assembly may also be provided which will expel backflowing pool water before it is allowed to backflow into the ozone generator. The water treatment system may further include an insulated electrolytic chlorine generator that mitigates or eliminates current leakage for efficient operation.

In one form thereof, the present disclosure provides a water treatment system configured for use with a pool. The water treatment system includes a housing defining a chamber and including a first mating structure and a nozzle receiver, a cover removably coupled to the housing to selectively open and close the chamber, and an ozone generator removably received within the chamber, the ozone generator including a second mating structure and a discharge nozzle configured to discharge ozone gas. When the ozone generator is seated in the chamber, the second mating structure mates with the first mating structure, and the discharge nozzle sealingly engages the nozzle receiver to discharge ozone gas to the nozzle receiver.

In another form thereof, the present disclosure provides a water treatment system configured for use with a pool. The water treatment system includes a fluid passageway in fluid communication with the pool, an ozone generator configured to deliver ozone gas to the fluid passageway, and a drain valve assembly positioned downstream of the ozone generator and upstream of the pool. The drain valve assembly includes a valve body including an inlet, an outlet, and a drain outlet, and a floating valve disposed within the valve body, wherein the floating valve closes the drain outlet when water enters the inlet of the valve body from the ozone generator and floats upward to open the drain outlet when water enters the outlet of the valve body from the pool.

In yet another form thereof, the present disclosure provides a water treatment system configured for use with a pool. The water treatment system includes an electrolytic chlorine generator, an ozone generator, a first fluid passageway including the electrolytic chlorine generator, a second fluid passageway including a venturi structure with a suction inlet configured to receive ozone gas from the ozone generator, a fluid inlet in communication with the first and second fluid passageways, and a fluid outlet in communication with the first and second fluid passageways.

In still another form thereof, the present disclosure provides a water treatment system configured for use with a pool. The water treatment system includes a fluid passageway in fluid communication with the pool, and an electrolytic chlorine generator disposed in the fluid passageway and including an insulating frame, a first electrode plate supported by the insulating frame and having a first side edge, a second electrode plate supported by the insulating frame and having a second side edge positioned adjacent to the first side edge of the first electrode plate, and an insulating separator positioned between the first and second electrode plates, the insulting separator protruding outward beyond the first and second side edges.

In still another form thereof, the present disclosure provides a water treatment system configured for use with a pool. The water treatment system includes a housing defining a chamber, an electrolytic chlorine generator supported by the housing, an ozone generator removably received within the chamber of the housing, a first fluid passageway including the electrolytic chlorine generator, a second fluid passageway including a venturi structure with a suction inlet configured to receive ozone gas from the ozone generator, a drain valve assembly positioned downstream of the ozone generator and upstream of the pool, wherein the drain valve assembly includes a floating valve that closes a drain outlet when water enters the drain valve assembly from the ozone generator and floats to open the drain outlet when water enters the drain valve assembly from the pool. In certain embodiments, the electrolytic chlorine generator includes an insulating frame, a first electrode plate supported by the insulating frame and having a first side edge, a second electrode plate supported by the insulating frame and having a second side edge positioned adjacent to the first side edge of the first electrode plate, and an insulating separator positioned between the first and second electrode plates, the insulting separator protruding outward beyond the first and second side edges.

BRIEF DESCRIPTION OF THE DRAWINGS

The above mentioned and other features and advantages of this disclosure, and the manner of attaining them, will become more apparent and the invention itself will be better understood by reference to the following description of embodiments of the invention taken in conjunction with the accompanying drawings, wherein:

FIG. 18 is a side elevation, cross-sectional view of the combination treatment assembly shown in FIG. 16;

DETAILED DESCRIPTION

Figure 1:
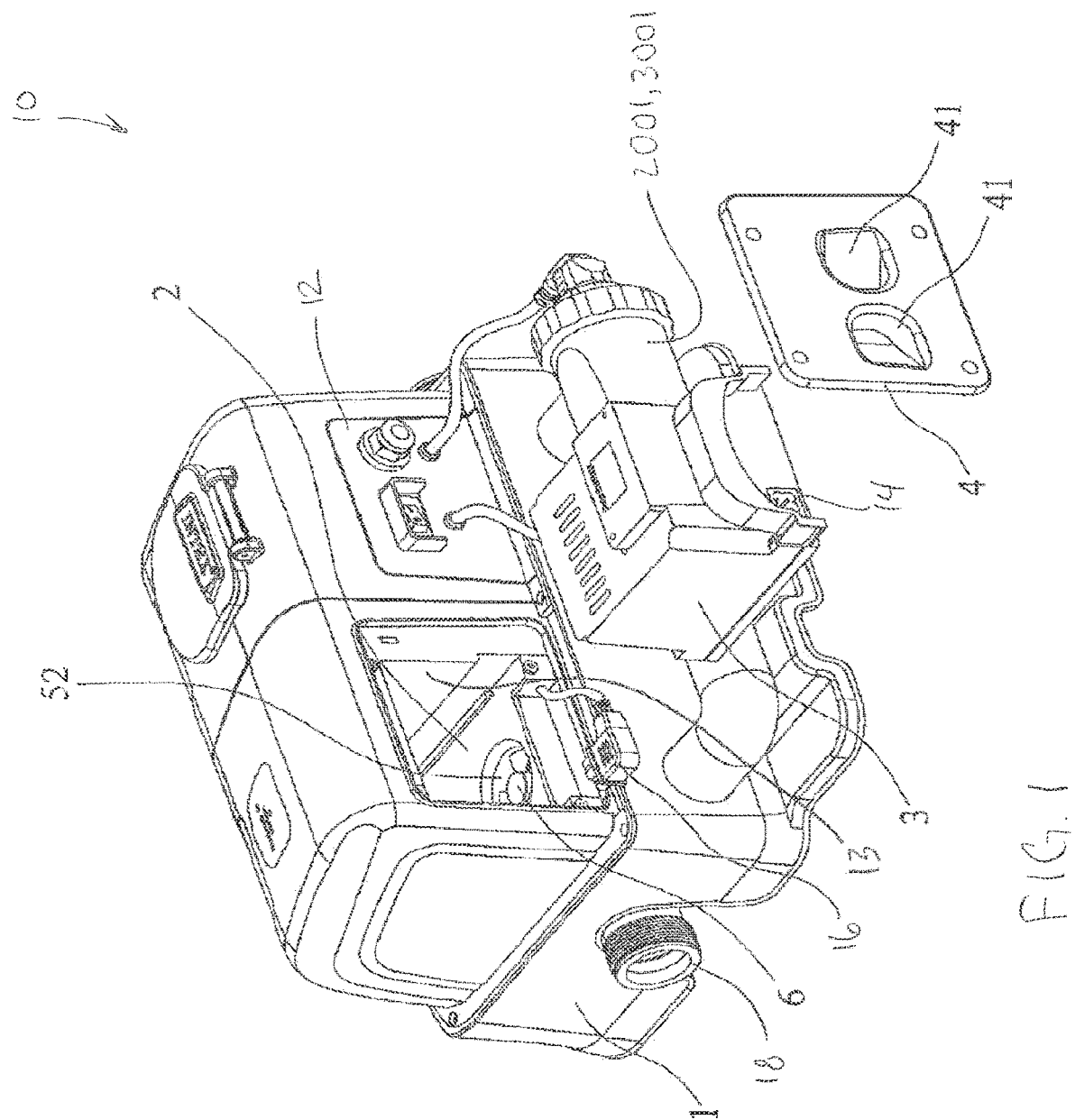
FIG. 1 is a perspective, exploded view of a water treatment system having a modular and replaceable ozone generator, a removable cover, and a combination ozone/sodium hypochlorite treatment system in accordance with the present disclosure.
Figure 13:
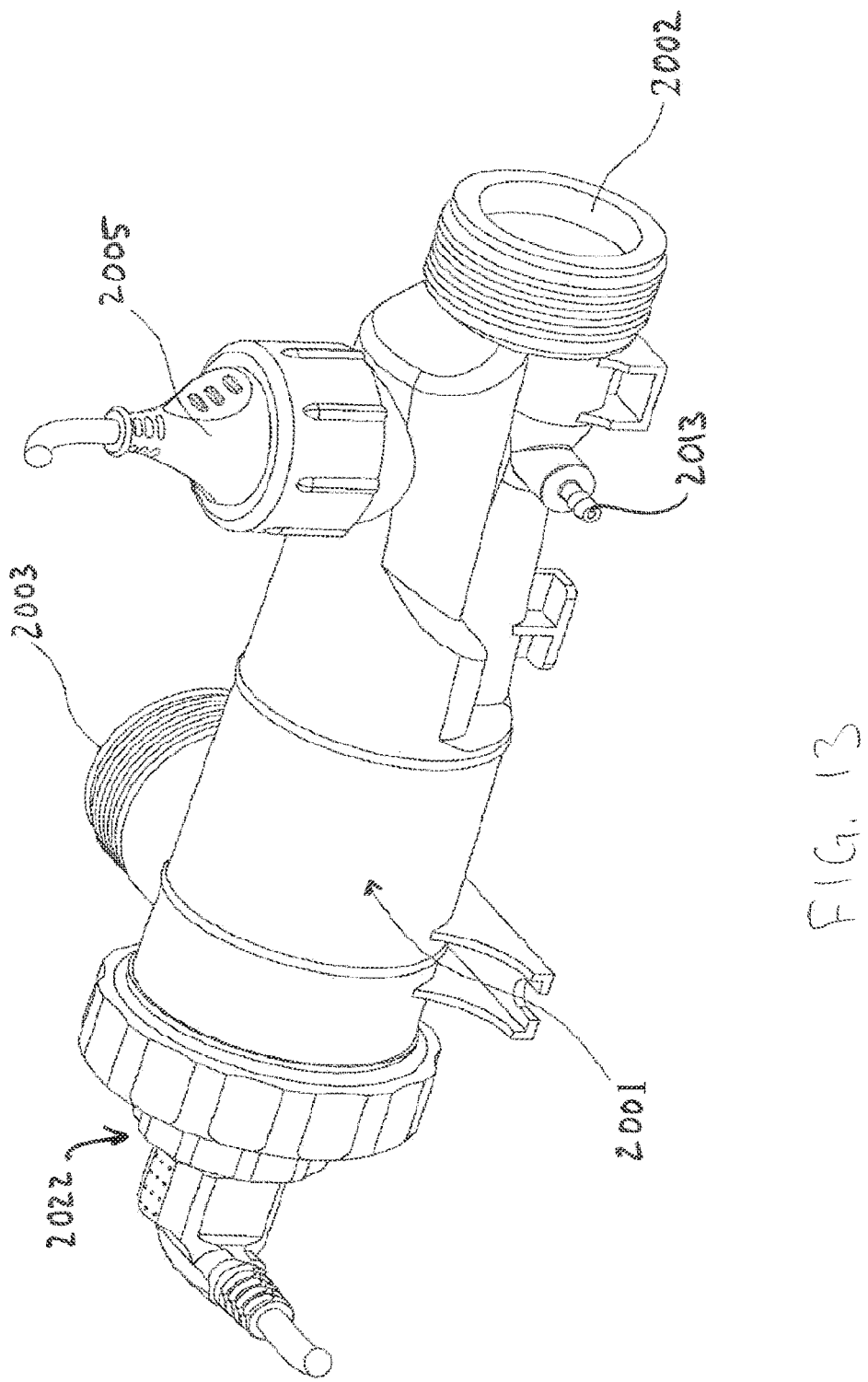
FIG. 13 is a perspective view of a combination ozone/sodium hypochlorite treatment assembly made in accordance with the present disclosure.

Referring initially to FIG. 1, a water treatment system 10 is shown for disinfecting and maintaining the cleanliness of the water in a pool, spa, or other water containment structure. For purposes of the present disclosure, "pool" may be used to refer to any water enclosure (i.e., an area designed to pool water), including swimming pools, spas, hot tubs and the like. As described in detail below, water treatment system 10 includes a number of features for ease of use and maintenance, long service life, and effective operation. Such features include a modular and replaceable ozone generator 3 (FIG. 1), a drain valve assembly 1001 (FIG. 5) designed to protect an ozone generator, such as the modular ozone generator 3, from water backflow, a combination ozone/sodium hypochlorite treatment assembly 2001, 3001 (FIGS. 13 and 16, respectively) which allow ozone generation and electrochlorination to be efficiently used in combination for pool disinfection, and an insulated electrolytic chlorine generator 4010 (FIG. 23) which protects the electrolysis element from an incidental or accidental moisture exposure.

1. Replaceable Ozone Generator Module

Water treatment system 10 of FIG. 1 includes a modular and replaceable ozone generator 3 that is configured to generate ozone gas. Ozone generator 3 is removably mounted to a housing (specifically, a base 1 of the housing). Ozone generator 3 is sized and shaped for receipt in a chamber 2 defined by the housing and is removably coupled to base 1 via a dovetail arrangement between ozone generator 3 and receiver 5 (FIG. 3), as detailed below. When ozone generator 3 is fully seated within chamber 2, an ozone discharge nozzle 32 (FIG. 3) is aligned and sealingly engaged with an ozone nozzle receiver 21 (FIG. 3) of base 1, such that the outflow of ozone gas generated by ozone generator 3 can be directed to a pool via other piping structures within the housing, such as via combination treatment assemblies 2001 and/or 3001 as detailed below. A detachable cover 4 is provided to selectively close chamber 2 when cover 4 is coupled to the surrounding housing, thereby covering ozone generator 3, and to open chamber 2 when cover 4 is detached from the housing, thereby exposing ozone generator 3.

Figure 3:
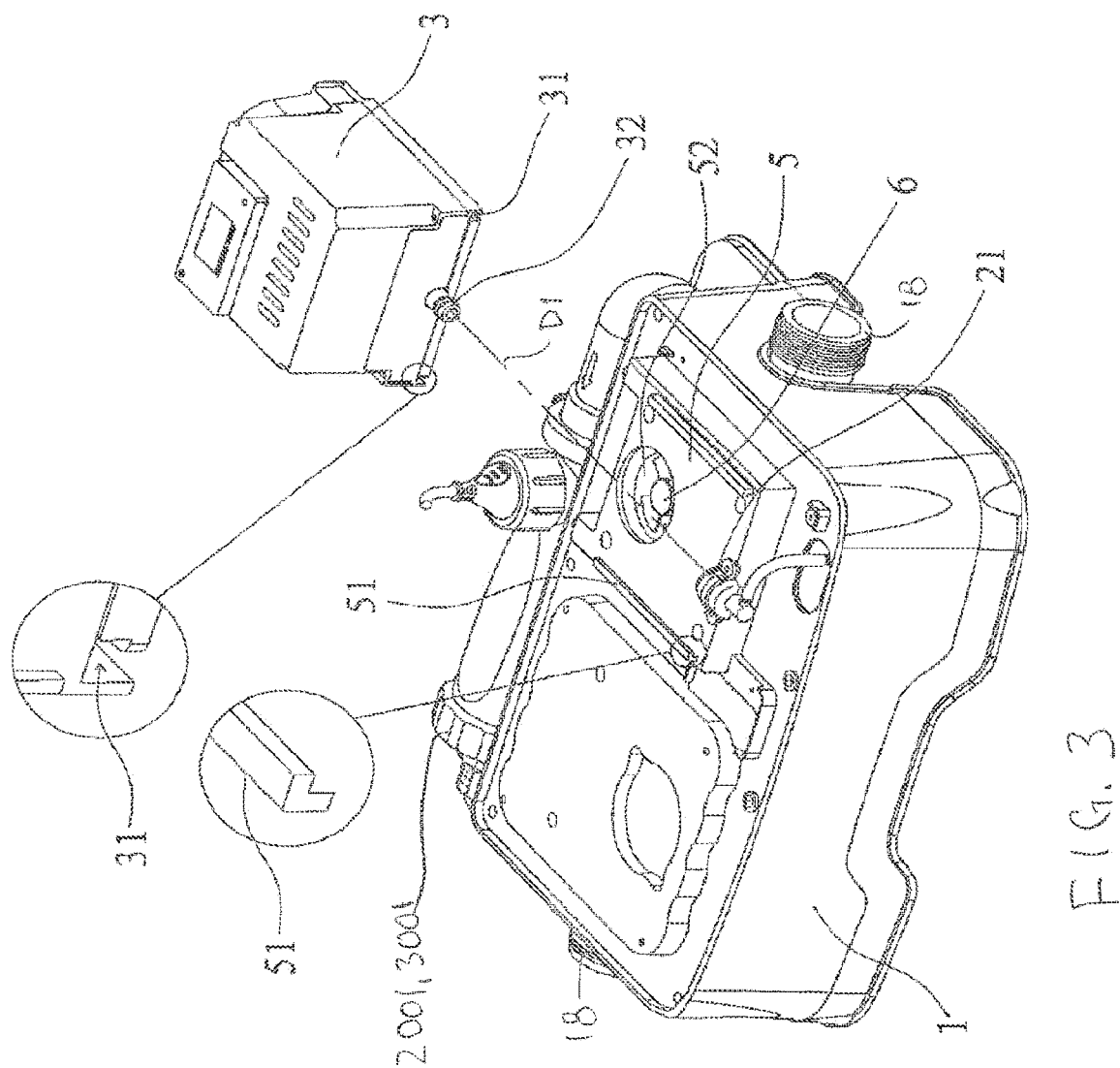
FIG. 3 is a perspective view of a base of the water treatment system of FIG. 1, illustrating attachment of the ozone generator thereto.
Figure 4:
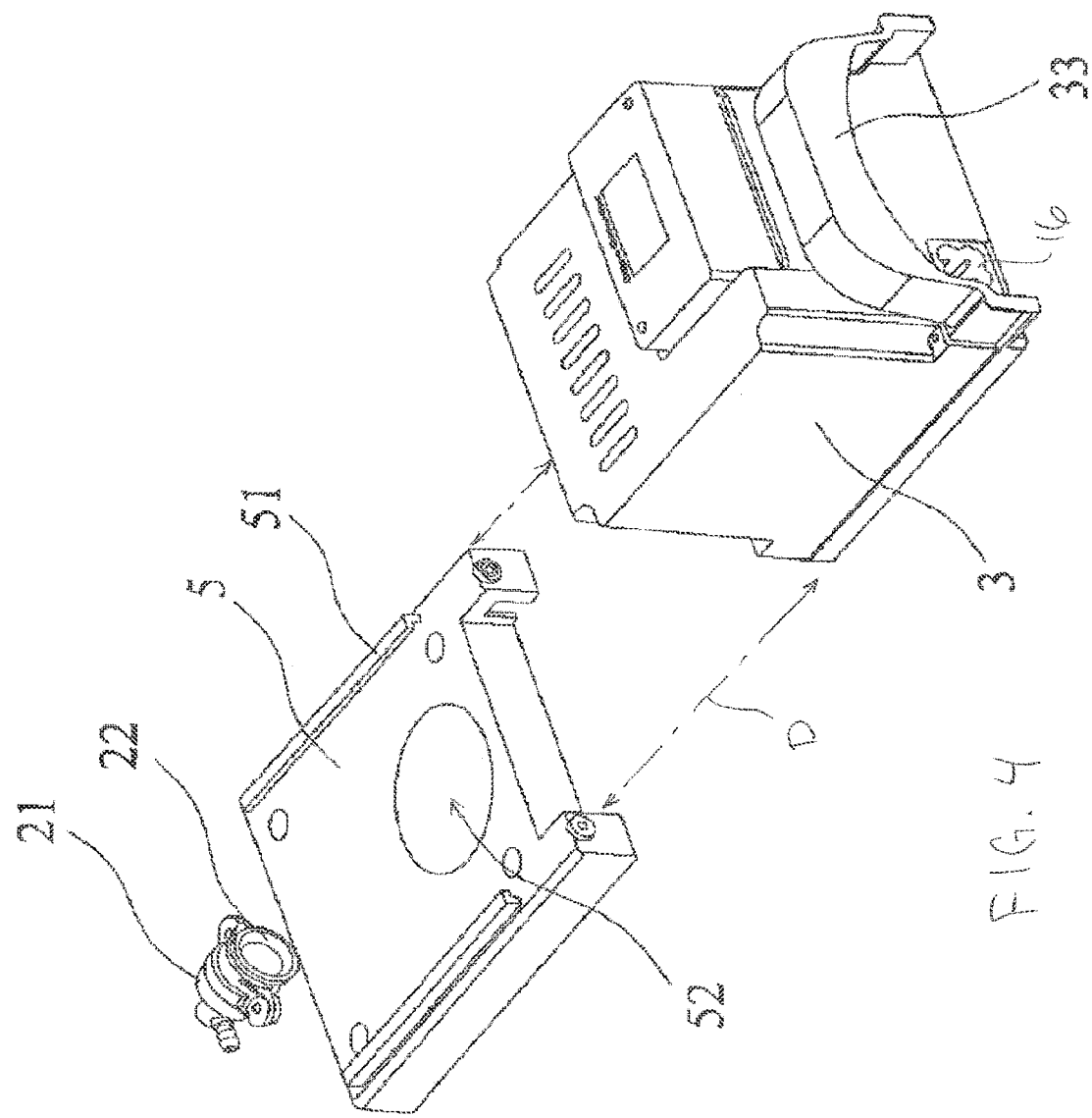
FIG. 4 is a perspective view of a receiver of the base, together with the ozone generator received by the receiver.

Referring to FIGS. 3 and 4, receiver 5 is disposed within chamber 2 and includes a first mating structure, illustratively rails 51, which mate with a second mating structure formed on ozone generator 3, illustratively respective grooves 31, to form a mating connection therebetween, illustratively a dovetail connection. In particular, a rail 51 is respectively arranged on both sides of the upper surface of the receiver 5, and two corresponding grooves 31 are provided on the lower surface of the ozone generator 3. When the ozone generator 3 is installed into or removed from the chamber 2, grooves 31 slide over rails 51 to constrain the movement of ozone generator 3 to a substantially linear front-to-back direction D (FIG. 4), while preventing any significant lateral and vertical motion therebetween. Any friction between the ozone generator 3 and the chamber 2 can be reduced through lubricity and appropriate tolerancing between the rails 51 and the grooves 31. Although grooves 31 are shown in connection with ozone generator 3 and rails 51 are shown in connection with receiver 5, this arrangement may of course be reversed such that rails 51 are disposed on the ozone generator 3 and grooves 31 are disposed on the receiver 5 of the base 1.

The dovetail connection between receiver 5 and ozone generator 3 also facilitates a precise and fluid-tight gas junction between ozone nozzle receiver 21 within chamber 2 when ozone generator 3 is installed onto the base 1. As the ozone generator 3 is advanced along direction D (FIG. 4) toward its fully seated position within chamber 2 (where the fully seated position is the position shown in FIG. 2), the rails 51 are substantially fully engaged within the corresponding grooves 31 such that lateral and vertical constraints are near a maximum. The discharge nozzle 32 advances rearwardly along direction D1 (FIG. 3), which is parallel to direction D defined by rails 51 and grooves 31. Thus, as rails 51 and grooves become fully engaged, discharge nozzle 32 also becomes precisely aligned with ozone nozzle receiver 21 and a fluid-tight connection can easily be made therebetween upon final seating of ozone generator 3 in chamber 2.

Despite this precision, a certain amount of lateral and/or vertical deviation may be designed in to the dovetail connection formed by rails 51 and grooves 31, such as to ensure a low-friction interface therebetween. In order to accommodate this intentional deviation, without any leaks or undue stresses at the connection between discharge nozzle 32 and nozzle receiver 21, a tapered guide surface 22 is provided at the opening of nozzle receiver 21, as best seen in FIG. 4. As the ozone generator 3 approaches its final seated position within the chamber 2, any slight deviation from perfect alignment between discharge nozzle 32 and nozzle receiver 21 permitted by the dovetail connection between rails 51 and grooves 31, is remedied by tapered guide surface 22. In particular, tapered guide surface 22 may made initial contact with a misaligned discharge nozzle 32, and then gradually correct the alignment until discharge nozzle 32 comes into sealing engagement with nozzle receiver 21 by the tapered guide surface 22.

In an exemplary embodiment, any live electrical parts associated with the activation of ozone generator 3 are shielded from operator access by the design of water treatment system 10. In particular, live electrical components are absent from chamber 2 when ozone generator 3 is removed, and the electrical components within ozone generator 3 are made inaccessible via the housing of ozone generator 3. Electrical components connected to control panel 12, including a power switch, a fuse and related wiring, are isolated from chamber 2 by an internal divider as shown in FIG. 1. Electrical power for ozone generator 3 is conveyed from control panel 12 to ozone generator 3 via receptacle 14 on ozone generator 3 and electrical connector 16 connected to base 1. In the illustrated embodiment, connector 16 can pivot downwardly (as shown) to allow ozone generator 3 to pass freely into or out of chamber 2 without interference. Once ozone generator 3 is seated within chamber 2, connector 16 can be pivoted up to engage receptacle 14 and electrically connect therewith. Connector 16 can selectively provide power to receptacle 14, and therefore to ozone generator 3, when so connected. In one embodiment, connector 16 is non-powered when pivoted down as shown in FIG. 1. Alternatively, the electrically conductive components of connector 16 may be physically isolated from the operator, in the manner of an insulated plug. Together, these features ensure that the user does not touch the live parts when replacing the ozone generator 3, thereby enhancing the safety of water treatment system 10.

A circular hole 52 may be formed in receiver 5 as best shown in FIGS. 3 and 4. A cooling fan 6 (FIG. 3) is mounted within base 1 at the circular hole 52. The fan 6 can discharge heat generated by the ozone generator 3, such that the heat is forced out of chamber 2. This prevents the ozone generator 3 from being damaged due to overheating, thereby prolonging the service life of ozone generator 3.

In an exemplary embodiment, a handle 33 may be provided on the outer side of the ozone generator 3 to facilitate the removal and replacement thereof. In use, an operator may grasp the handle 33, and pull on handle 33 to conveniently remove the ozone generator 3 from the chamber 2, or push on handle 33 to place ozone generator 3 in the chamber 2. Similarly, in order to facilitate the installation and removal of the rear cover 4, a handle may be provided on the rear cover 4 in the form of a pair of gripping holes 41.

The modular replaceability of ozone generator 3 within the larger structure of water treatment system 10 facilitates the replacement of the ozone generator 3 should it become damaged or in need of service. Because only the ozone generator 3 needs to be replaced, such maintenance or repair operations are simpler, lower-cost, and can involve less down time if a spare ozone generator 3 is kept readily available.

In use, an operator may assess the operation state of ozone generator 3. If ozone generator 3 is damaged or otherwise in need of replacement, the operator removes the rear cover 4 on the chamber 2 to expose the ozone generator 3, which is then removed from the chamber 2 by sliding ozone generator 3 along horizontal direction D defined by the dovetail engagement between ozone generator 3 and receiver 5, as shown in FIG. 4 and described above. Discharge nozzle 32 of the ozone generator 3 becomes separated from nozzle receiver 21 during the initial withdrawal of ozone generator 3, after which ozone generator 3 can be slid the rest of the way out of chamber 2. Then, functional ozone generator 3 can be put into the chamber 2 via the dovetail arrangement, with discharge nozzle 32 becoming aligned with nozzle receiver 21 via tapered guide surface 22. When ozone generator 3 is fully seated within chamber 2, discharge nozzle 32 is sealingly engaged with nozzle receiver 21. Finally, the rear cover 4 may be reconnected to the opening of chamber 2.

2. Protective Drain Valve Assembly

Water treatment system 10 is connected to a pool 1003 via a pair of water flow couplers 18 (FIGS. 1-3 and 6). Water enters an intake coupler 18, is treated with ozone from ozone generator 3, and discharged at the opposing outlet coupler 18. In an exemplary embodiment, the discharge flow line downstream of water treatment system 10 may include drain valve assembly 1001 shown in FIGS. 5 and 6, which operates to protect ozone generator 3 and other sensitive components of water treatment system 10 from a potentially damaging water backflow from pool 1003.

Figure 5:
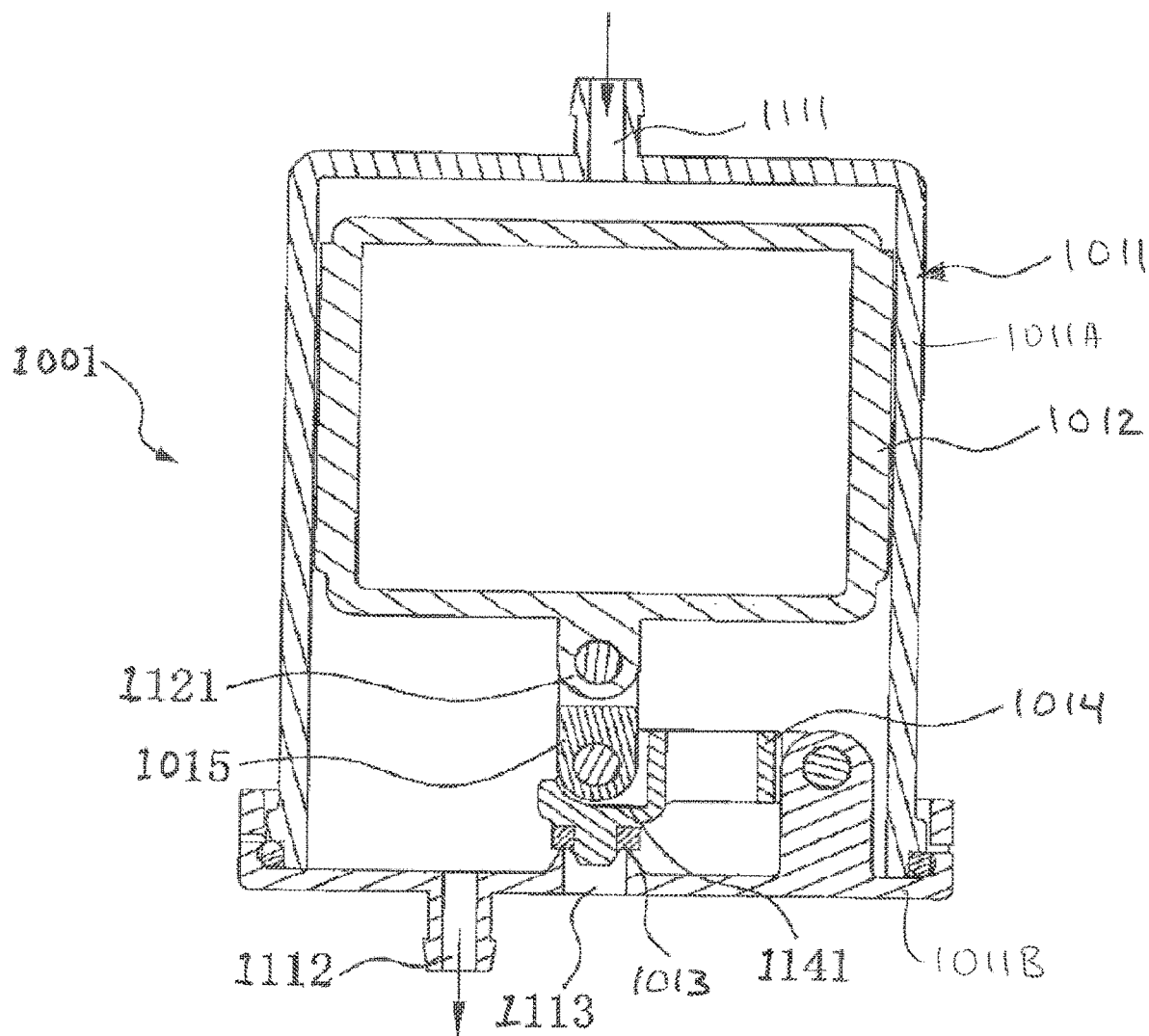
FIG. 5 is an elevation, cross-section view of a drain valve assembly made in accordance with the present disclosure.
Figure 6:
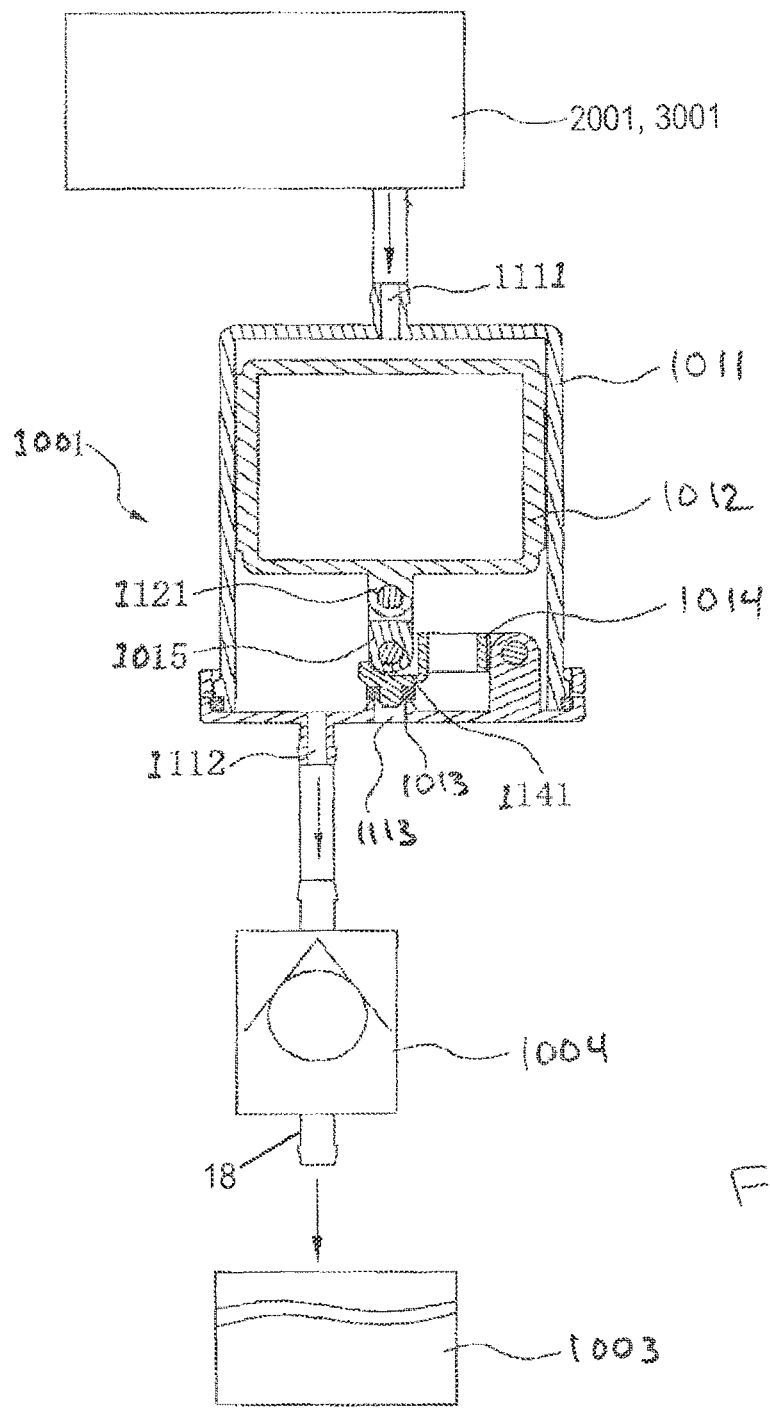
FIG. 6 is a schematic view of the connection between the drain valve assembly of FIG. 5, the upstream combination treatment assembly, and a downstream pool.

Referring to FIGS. 5 and 6, drain valve assembly 1001 includes a hollow valve body 1011, illustrated as a bucket-shaped portion 1011A having a cap 1011B sealingly affixed thereto. An upstream wall of the valve body 1011 has an inlet 1111 in fluid communication with a combination treatment assembly 2001, 3001, while an opposing downstream wall of the valve body (illustratively, the cap 1011B) has an outlet 1112 in fluid communication with pool 1003 and a drain outlet 1113 formed therethrough.

A float 1012 is disposed inside the valve body 1011 and is capable of moving upwardly and downwardly through a stroke length within the interior cavity of valve body 1011. As float 1012 moves upwardly or downwardly, a sealing gasket 1013 is unseated or seated into water drain outlet 1113, such that gasket 1013 either allows or prevents a fluid flow through drain outlet 1113. In the illustrated embodiment, the sealing gasket 1013 is disposed at a free end 1141 of a connecting rod 1014, with the other end of the connecting rod 1014 pivotally connected to the valve body 1011 (e.g., via a stanchion connected to cap 1011B as shown). Below the float 1012 is provided another connecting rod 1121, which is directly or indirectly pivotally connected with the free end 1141 of the connecting rod 1014. When the float 1012 is directly pivoted to the connecting rod 1014, the float 1012 may tend to oscillate, and thus a second link 1015 can be pivotally connected between the connecting rod 1014 and the float 1012 to create an indirect pivotal connection between the connecting rods 1014 and 1121, which mitigates or prevents oscillation or "bobbing" of float 1012.

As noted above and as shown in FIG. 6, the drain valve assembly 1001 can be installed between the combination treatment assembly 2001, 3001, and the pool 1003, such that the combination treatment assembly 2001, 3001, is generally upstream of drain valve assembly 1001 and pool 1003 is generally downstream of drain valve assembly 1001 with respect to the normal flow direction from water treatment system 10 to pool 1003. A one-way valve 1004 may also be installed on the downstream side of valve 1001, at outlet 1112 as shown in FIG. 6. When the water treatment system 10 is operating, the treated water enters the inside of the valve body 1011 via inlet 1111 of the drain valve assembly 1001, exits drain valve assembly 1001 via outlet 1112 and then passes through the check valve 1004 into the swimming pool 1003. In this normal operating condition, gravity and the downstream flow of treated water bias float 1012 and free end 1141 of connecting rod 1014 downwardly, such that the sealing gasket 1013 seals the water drain outlet 1113. Thus, fluid is only allowed to flow from inlet 1111 to outlet 1112 during normal operation of water treatment system 10.

Figure 7:
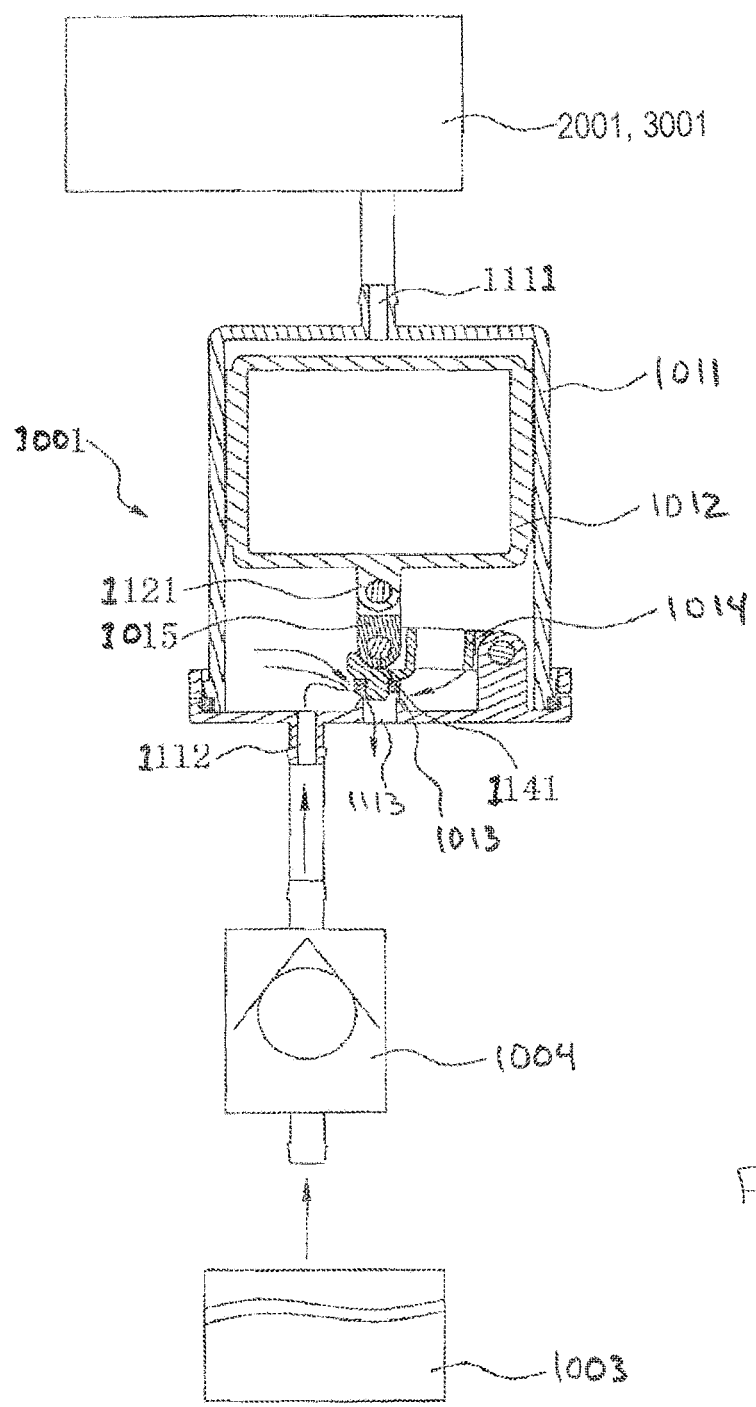
FIG. 7 is another schematic view of the connection shown in FIG. 6, except with a backflow flowing from the pool through the drain valve assembly.

However, if water treatment system 10 malfunctions or powers off and ceases providing a downstream flow of treated water, check valve 1004 may initially prevent the water in the pool 1003 from flowing back to the ozone generator 3 via the combination treatment assembly 2001, 3001. If the check valve 1004 is abnormal and also malfunctions or fails, as depicted in FIG. 7, any upstream water pressure from pool 1003 is prevented from reaching ozone generator 3 of water treatment system 10 by drain valve assembly 1001. In particular, as reverse water pressure (or "backflow") from pool 1003 begins to flood the internal cavity of valve body 1011 through outlet 1112, float 1012 becomes buoyant and begins to rise with the increasing water level. As float 1012 rises, the free end 1141 of the connecting rod 1014 is pulled upwardly to disengage the gasket 1013 from the drain outlet 1113 so that the drain outlet 1113 is opened. Further water ingress into valve body 1011 is then automatically discharged at the drain outlet 1113. In this way, the drain valve assembly 1001 can effectively protect the ozone generator 3 of water treatment system 10 from backflowing water, even if check valve 1004 fails or malfunctions.

Figure 8:
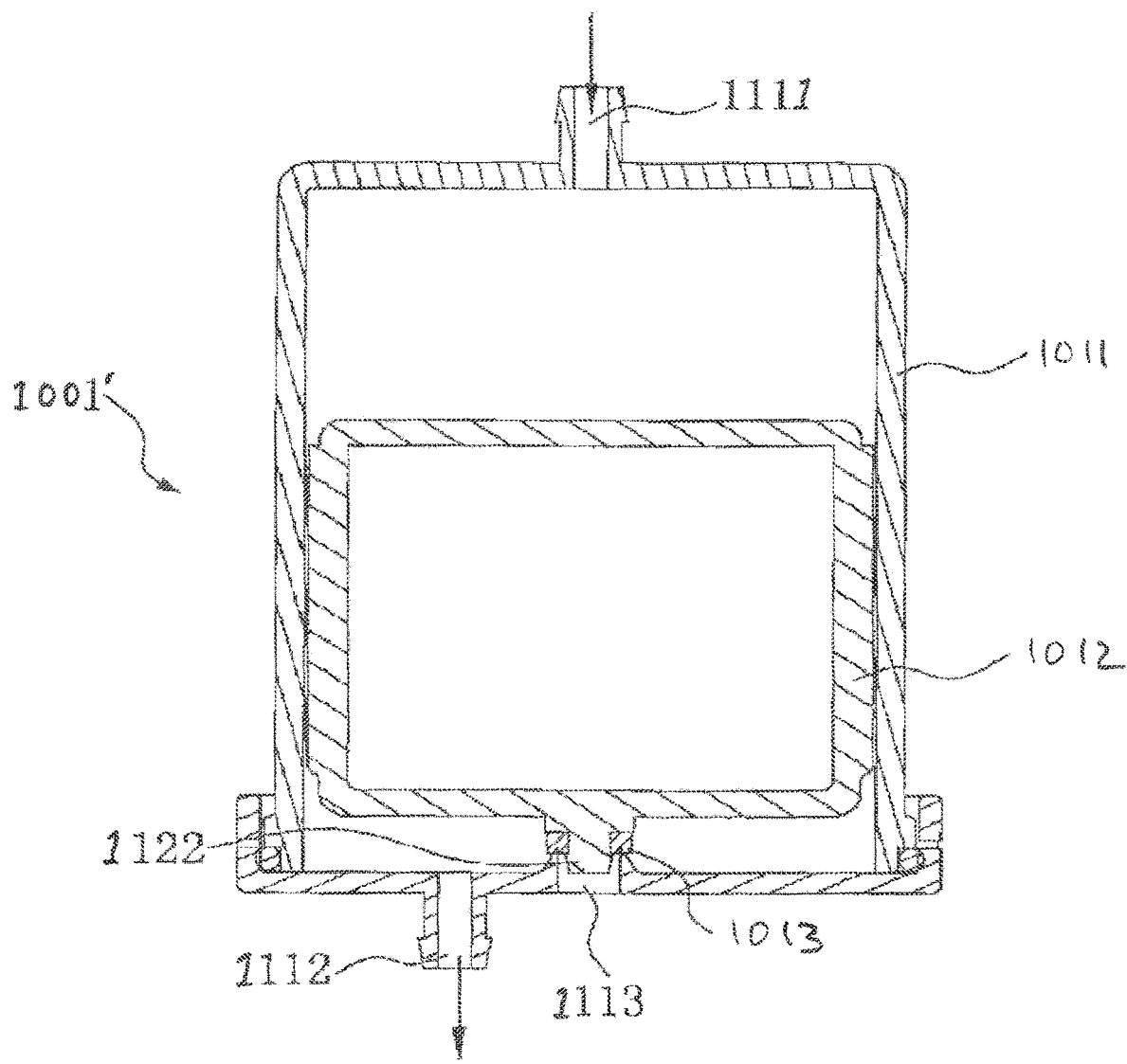
FIG. 8 is an elevation, cross-section view of another drain valve assembly made in accordance with the present disclosure.

FIG. 8 shows drain valve assembly 1001', which is another drain valve design accordance with the present disclosure. Valve 1001' is similar in structure and function to valve 1001 described above, and corresponding references numbers indicate corresponding structures among valves 1001, 1001'. For example, valve 1001' also includes a hollow valve body 1011 and a float 1012 disposed in the valve body 1011. The valve body 1011 also has an inlet 1111 and an outlet 1112 therethrough, and a drain outlet 1113 is formed at the bottom thereof. A sealing gasket 1013 is also connected below the float 1012 and the sealing gasket 1013 can be sealed on the drain outlet 1113.

However, gasket 1013 of valve 1001' is directly disposed on a boss 1122 below the float 1012, which obviates the need for a connecting rod such as connecting rods 1014, 1015 and 1121. Rather, gasket 1013 is directly mounted to float 1012.

Figure 9:
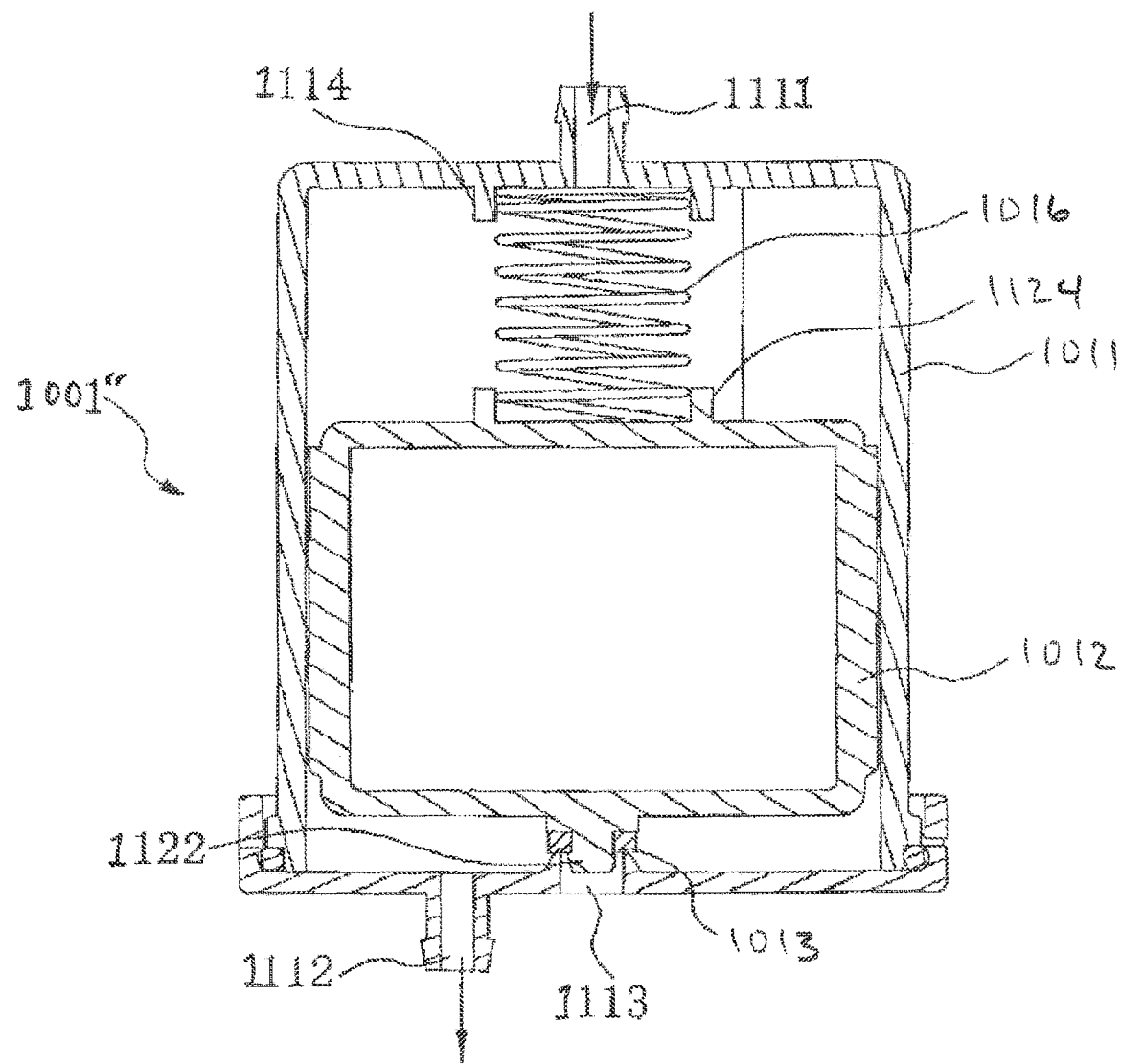
FIG. 9 is an elevation, cross-section view of another drain valve assembly made in accordance with the present disclosure.
Figure 10:
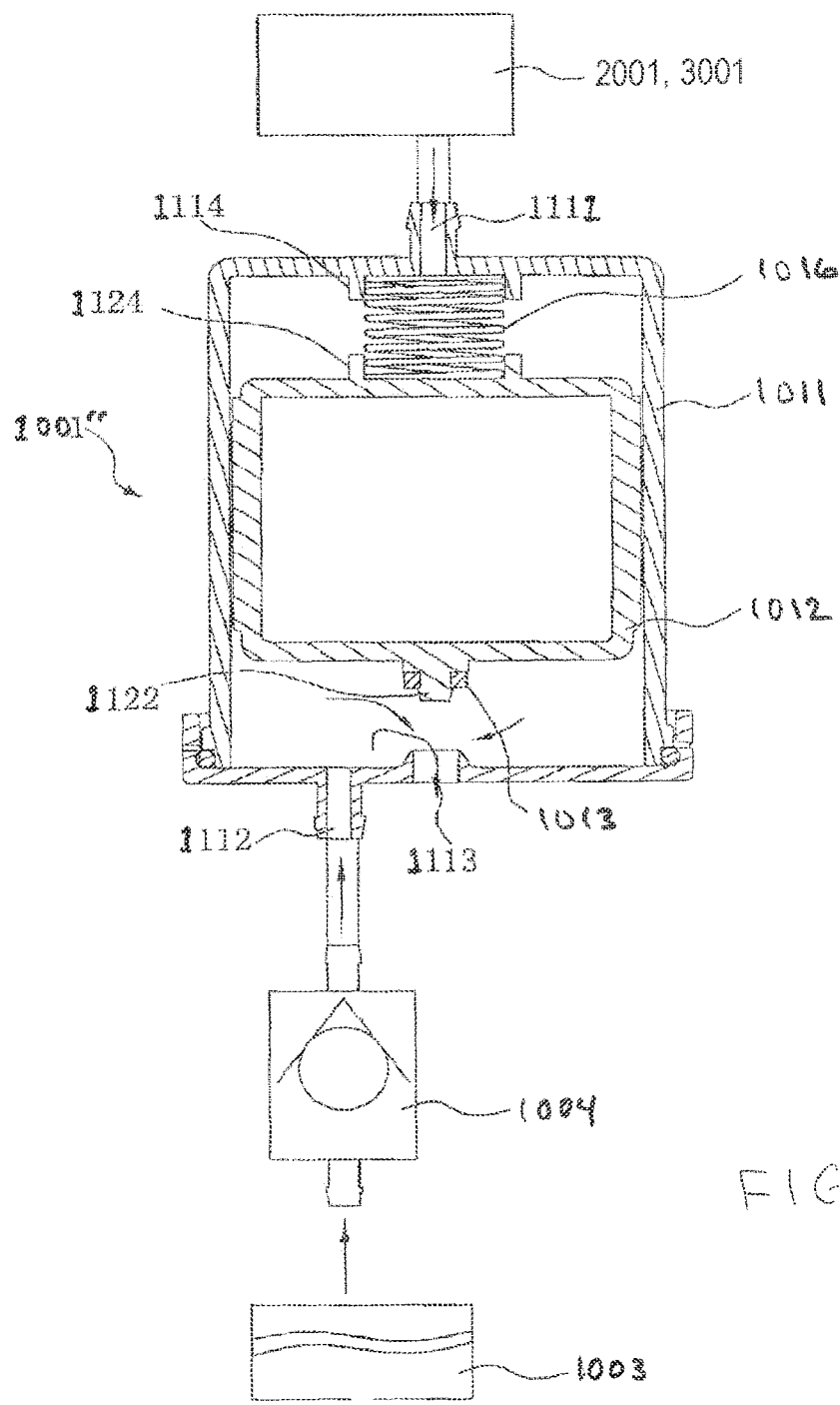
FIG. 10 is a schematic view of a connection between the drain valve assembly of FIG. 9, the upstream combination treatment assembly, and a backflow flowing from the pool.

FIGS. 9 and 10 show drain valve assembly 1001", which is another drain valve design accordance with the present disclosure. Valve 1001" is similar in structure and function to valves 1001 and 1001' described above, and corresponding references numbers indicate corresponding structures among valves 1001, 1001', 1001". For example, valve 1001" also includes a hollow valve body 1011 and a float 1012 disposed in the valve body 1011. The valve body 1011 has an inlet 1111 and an outlet 1112 therethrough, and a drain outlet 1113 is formed at the bottom thereof. The bottom of the float 1012 is provided with a boss 1122 having a gasket 1013 mounted thereto, and the gasket 1013 can be sealed on the drain outlet 1113.

However, drain valve assembly 1001" further includes a compression spring 1016 operably disposed between the float 1012 and the valve body 1011. When the float 1012 is in the lowered position with gasket 1013 sealing drain outlet 1113, as shown in FIG. 9, the spring 1016 is preloaded such that it is slightly compressed. Spring 1016 provides a downward biasing force on float 1012, which aids in the formation of a tight seal between gasket 1013 and drain outlet 1113. This tight seal prevents ozone from leaking at drain outlet 1113 during normal operation of drain valve assembly 1001".

In an exemplary embodiment, a lower axial end of spring 1016 is mounted in a recess formed by an upwardly protruding boss 1124 formed on the upper end of the float 1012. Similarly, an upper axial end of spring 1016 is received in a recess formed by a downwardly protruding boss 1114 formed on the upper inside surface of the valve body 1011. The spring 1016 is captured by the two bosses 1114, 1124, preventing any lateral movement of spring 1016 within valve body 1011.

In operation, float 1012 of drain valve assemblies 1001' and 1001" may be urged upwardly by a backflow of water from pool 1003 in a similar fashion as described above. With respect to drain valve assembly 1001", FIG. 10 illustrates the upward axial displacement of float 1012 resulting from such a backflow, against the biasing force of spring 1016 and the weight of float 1012. This upward displacement unseats gasket 1013 from drain outlet 1113, allowing the backflow to drain out of drain valve assembly 1001" (or drain valve assembly 1001', in the absence of spring 1016) to avoid water reaching water treatment system 10.

Figure 11:
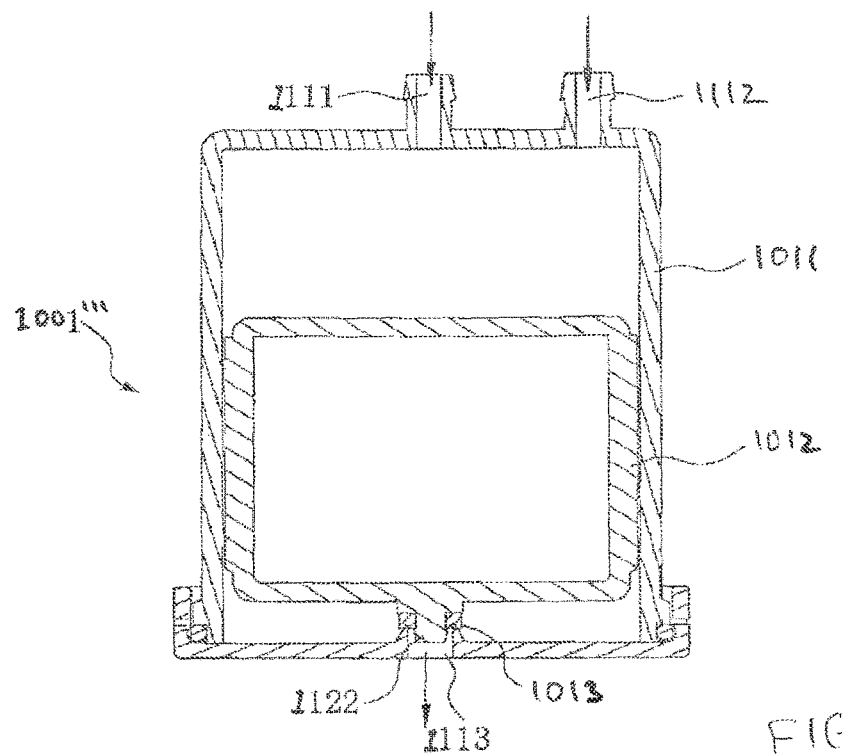
FIG. 11 is an elevation, cross-section view of another drain valve assembly made in accordance with the present disclosure.

Turning now to FIG. 11, drain valve assembly 1001''' is another drain valve design accordance with the present disclosure. Valve 1001''' is similar in structure and function to valves 1001, 1001' and 1001" described above, and corresponding references numbers indicate corresponding structures among valves 1001, 1001', 1001", 1001'. For example, valve 1001''' also includes a hollow valve body 1011 and a float 1012 disposed in the valve body 1011. The valve body 1011 has an inlet 1111 and an outlet 1112 therethrough. At the bottom, there is a drain outlet 1113. The bottom of the float 1012 is provided with a boss 1122 having a gasket 1013 mounted thereto, and the gasket 1013 can selectively seal the drain outlet 1113.

However, drain valve assembly 1001' has its inlet 1111 and the outlet 1112 both formed at the top of above the valve body 1011, in contrast to valves 1001, 1001' and 1001" which all show inlets 1111 disposed at a top portion of the valve body 1011 and outlets 1112 disposed at a bottom portion of the valve body 1011. Moreover, a drain valve assembly in accordance with the present disclosure may have its inlet and outlet disposed at any position of the valve body 1011, provided the drain outlet 1113 is disposed at a bottom portion the valve body 1011 to allow for gravitational draining of backflowing water. In the case of valve 1001', backflowing water received at the top-mounted outlet 1112 will fall to the bottom of the valve body 1011 under the force of gravity, and will then drain from the drain outlet 1113.

Figure 12:
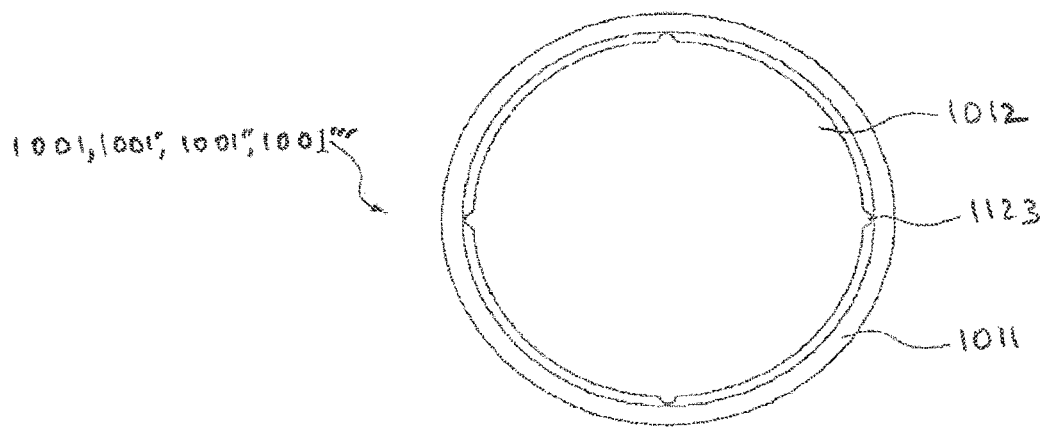
FIG. 12 is a plan, cross-sectional view of a drain valve assembly made in accordance with the present disclosure.

FIG. 12 illustrates a top plan view of an exemplary float 1012 which may be used in conjunction with any of the valve designs discussed above, illustrating the positioning of the float 1012 within the cavity formed by valve body 1011. As shown, float 1012 may be a generally cylindrical structure having a round appearance when viewed from above, and valve body may define a correspondingly cylindrical cavity. In this configuration, boss 1122 and gasket 1013 (FIGS. 8-11) are centered on the bottom of float 1012 to engage a correspondingly centered drain outlet 1113. This allows float 1012 to rotate about its longitudinal axis within valve body 1011, without affecting its ability to create a fluid-tight seal at drain outlet 1113. In order to ensure that the sealing gasket 1013 properly seats upon drain outlet 1113, however, it may be desirable to ensure that radial (i.e. lateral) movement of float 1012 relative to valve body 1011 is constrained. To this end, the outer periphery of float 1012 includes a plurality of ribs 1123, shown in FIG. 12, which operate to center the float 1012 within valve body 1011 while introducing minimal friction between float 1012 and valve body 1011. The gaps between the non-ribbed portions of float 1012 and the inner wall of the valve body 1011 allow free flow of gas and water during operation of the drain valve assembly 1001, 1001', 1001" or 1001'''.

The drain valve assemblies disclosed herein are particularly suitable for ozone generator applications in high water pressure environments. The ability of the drain valve assembly to protect the ozone generator from water ingress is reliable and long-lasting, and continues even if a traditional check valve experiences a failure. Moreover, references to the use of valve "1001" in connection with water treatment system 10 and other structures herein, including such references appearing in the drawings, may be considered a reference to any of drain valve assemblies 1001, 1001', 1001" or 1001'''.

3. Ozone Generation and Electrolytic Chlorine Generation in Combination

Figure 2:
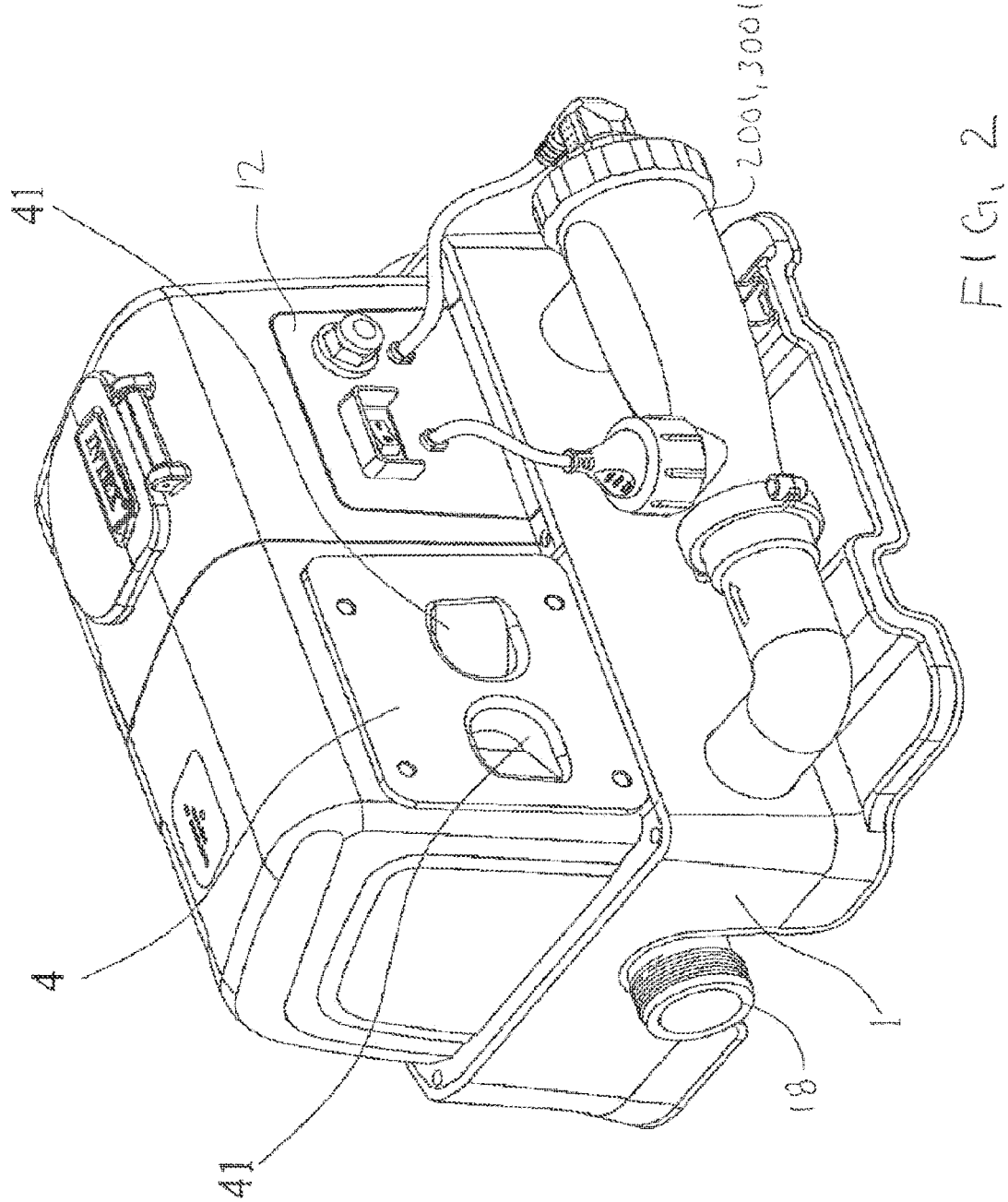
FIG. 2 is a perspective view of the water treatment system of FIG. 1, shown fully assembled.

Referring now to FIGS. 13-16, a combination ozone/sodium hypochlorite treatment assembly 2001 compatible with water treatment system 10 is shown and includes a tube-shaped tank having a fluid inlet 2002 and a fluid outlet 2003 which can be respectively connected to base 1 of water treatment system 10 as shown in FIGS. 1 and 2.

Figure 14:
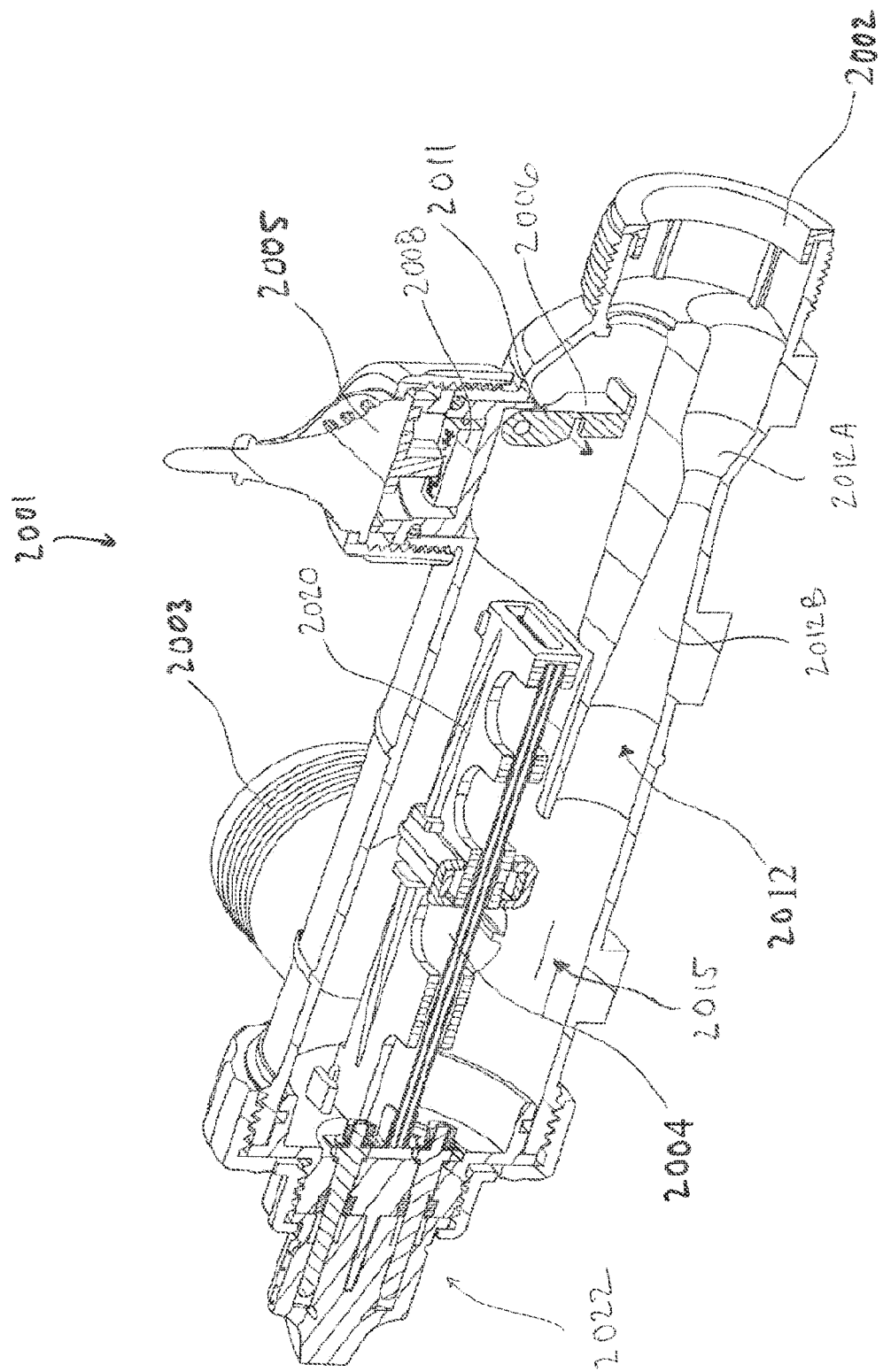
FIG. 14 is a perspective, cross-sectional view of the combination treatment assembly shown in FIG. 13.
Figure 15:
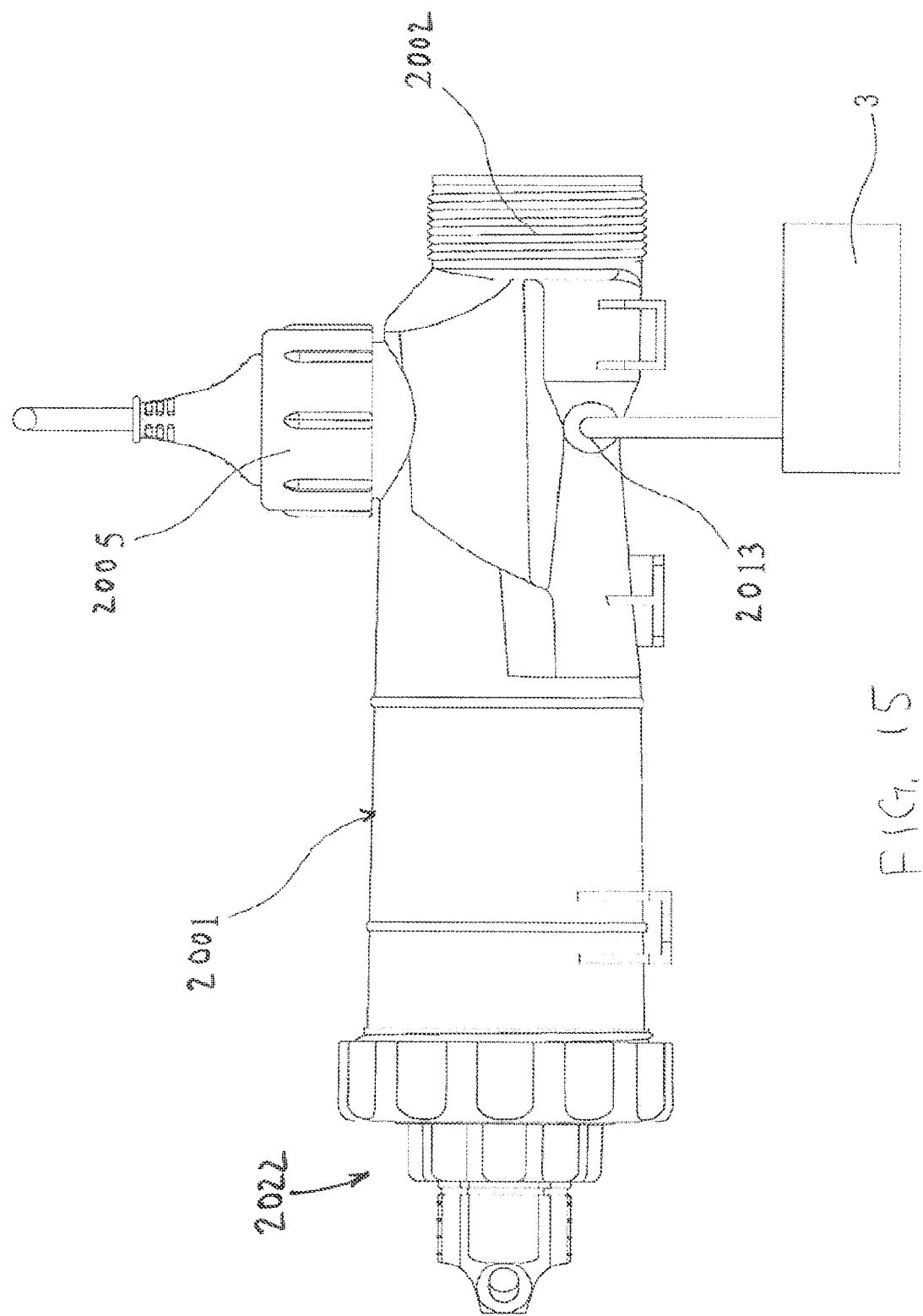
FIG. 15 is a side elevation view of the combination treatment assembly shown in FIG. 13, in combination with a schematic representation of other system components.

As shown in FIG. 14, a first flow passageway 2011 communicates with fluid inlet 2002, and fluid outlet 2003 via an intermediate mixing chamber 2015 while a separate second flow passageway 2012 communicates fluid inlet 2002 and fluid outlet 2003 via mixing chamber 2015. The first flow passageway 2011 has an electrolytic chlorine generator with electrode plates 2004, specifically titanium electrode plates 2004. The second passageway 2012 includes a constriction 2012A followed by a downstream opening 2012B to define a venturi structure. The second flow passageway 2012 further incudes an ozone inlet 2013 (FIG. 15) to which the ozone generator 3 of water treatment system 10 can be connected in order to feed ozone into combination treatment assembly 2001 as further described below.

The fluid inlet 2002 of combination treatment assembly 2001 may be connected to the fluid outlet of a water pump, which feeds water to be sanitized into combination treatment assembly 2001. The fluid outlet 2003 of combination treatment assembly 2001 is connected to the pool, to feed sanitized water back to the pool. As water is received from the water pump at the fluid inlet 2002, the incoming flow is divided into two water flows to first and second flow passages 2011 and 2012 for parallel treatment.

The water that flows into first flow passageway 2011 comes into contact with titanium plate 2004 of the electrolytic chlorine generator, which electrolyzes salt in the water to produce sodium hypochlorite to sanitize the water flow.

This generated sodium hypochlorite continues with the sanitized flow of the water to the fluid outlet 2003 of combination treatment assembly 2001 and is returned to the pool. The water that flows into second flow passageway 2012 encounters the venturi structure 2012A, 2012B therein, such that a vacuum effect is generated at the ozone inlet 2013. This vacuum draws the ozone generated by the ozone generator 3 of water treatment system 10 into the water flow through passageway 2012 via the ozone inlet 2013. The ozone mixes with the water flow in mixing chamber 2015 (FIG. 14), sanitizing the water flow. This sanitized water flows to the fluid outlet 2003 of combination treatment assembly 2001 and is returned to the pool. The sodium hypochlorite-containing water stream and the ozone-containing water stream are also mixed with one another at the fluid outlet 2003, so that the combined sanitized water flows return to the pool together to sterilize the pool water.

Referring now to FIG. 14, a retainer 2020 may be disposed in the first passageway 2011, and may retain the titanium plate 2004 while having a number of apertures to ensure adequate contact of the water flow with the titanium plate 2004. An electrical plug 2022 may be provided at one end of combination treatment assembly 2001, and electrically connected to plate 2004 as illustrated in FIG. 14. In an exemplary embodiment, the titanium plate 2004 may be provided with a tantalum oxide coating or a tantalum oxide coating to enhance plate function.

In an exemplary embodiment of combination treatment assembly 2001, a flow rate monitoring switch 2005 can be disposed on the first passageway 2011 and may be operable to selectively interrupt the flow of electrical current to plate 2004 via plug 2022. Flow switch 2005 includes a pivoting flapper 2006 in the flow path of flow passageway 2011. With a sufficient flow of water through first passageway 2011, flapper 2006 pivots upwardly toward switch 2008, and switch 2008 electrically activates the power supply to plug 2022 and plate 2004. By contrast, with an insufficient flow of water through first passageway 2011, flapper 2006 is unable to pivot upwardly toward switch 2008, so plug 2022 and plate 2004 are deactivated. In this way, plate 2004 of the electrolytic chlorine generator is prevented from receiving electrical current in the absence of a sufficient flow of water through flow passageway 2011, thereby protecting plate 2004 from overheating and any associated degradation.

Combination treatment assembly 2001 combines the electrolytic chlorine generator (e.g., the titanium plate 2004 and associated structures) and the venturi structure 2012A, 2012B linked to ozone generator 3 into a single unit contained within a relatively small overall space. This saves space and cost associated with piping for two separate sanitization flows, since only a single flow to inlet 2002 and from outlet 2003 is necessary to discharge the dual-sanitized flow from combination treatment assembly 2001.

Turning now to FIGS. 16-21, a further combination treatment assembly 3001 is shown which provides a flow regulator or restrictor 3007 to ensure that the combination treatment assembly 3001 is capable of effectively drawing ozone and/or disinfectant to ensure the quality of the pool water disinfection, as described in detail below. Combination treatment assembly 3001 is substantially similar to combination treatment assembly 2001 described in detail above, with reference numerals of combination treatment assembly 3001 analogous to the reference numerals used in combination treatment assembly 2001, except with 1000 added thereto. Elements of combination treatment assembly 3001 correspond to similar elements denoted by corresponding reference numerals of combination treatment assembly 2001, except as otherwise noted.

Figure 16:
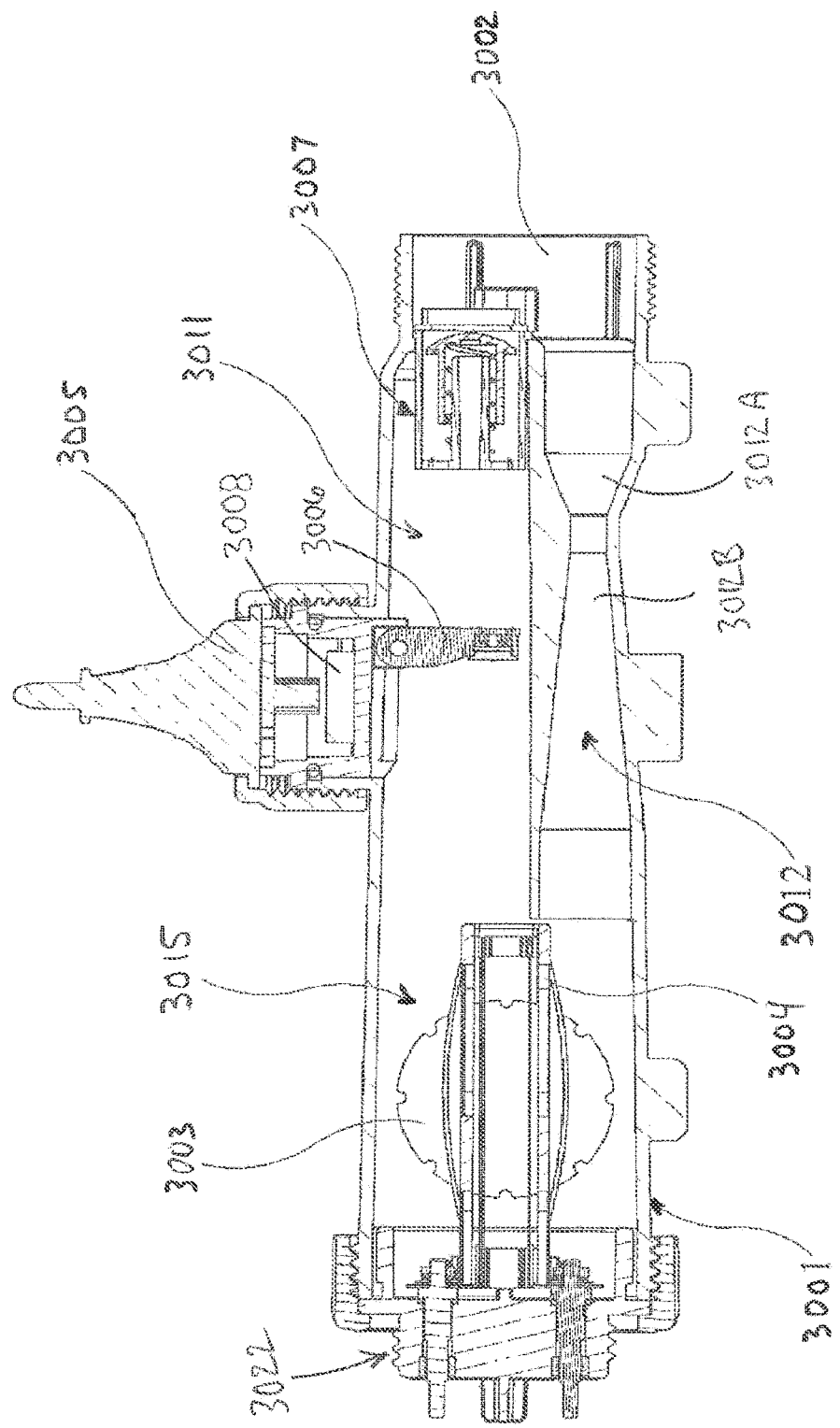
FIG. 16 is a perspective view of another combination ozone/sodium hypochlorite treatment assembly made in accordance with the present disclosure.

Similar to combination treatment assembly 2001, combination treatment assembly 3001 includes a tube-shaped tank with a fluid inlet 3002 and a fluid outlet 3003, first and second fluid passageways 3011 and 3012, and a fluid mixing chamber 3015 downstream of inlet 3002 and upstream of outlet 3003. The second fluid passageway 3012 forms a venturi structure 3012A, 3012B with an ozone suction inlet 3013 (FIG. 16). An electrode plate 3004 is provided in the fluid mixing chamber 3015 and adapted to perform electrochlorination on the salt water flow through passageway 3011 and within mixing chamber 3015.

Figure 17:
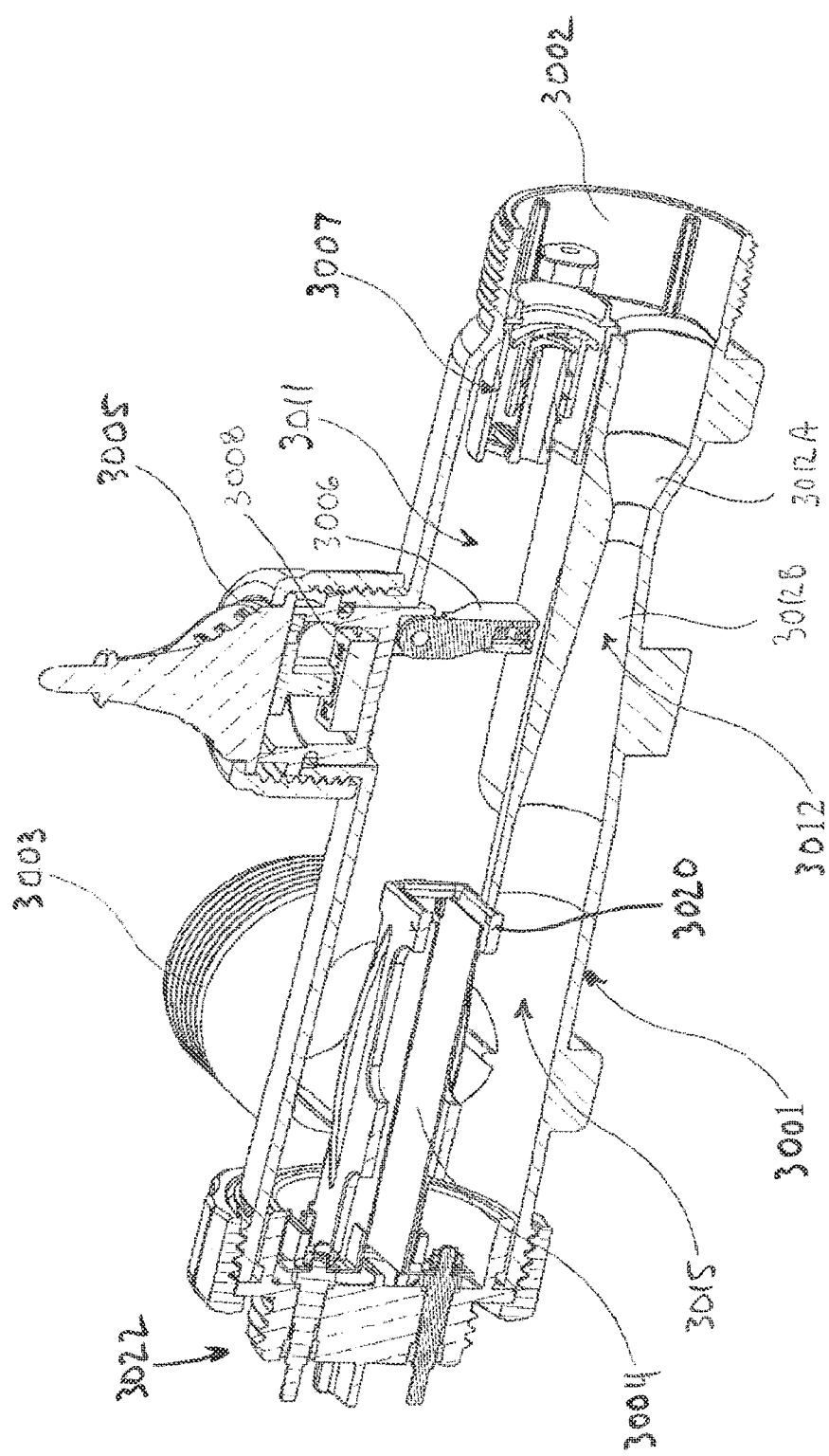
FIG. 17 is a perspective, cross-sectional view of the combination treatment assembly shown in FIG. 16.

However, the first fluid passageway 3011 includes a flow regulating valve 3007 shown in FIGS. 17 and 18. Valve 3007 is disposed at the upstream end of the first fluid passageway 3011. Flow regulating valve 3007 is operable to control the flow of water entering the first passageway 3011, as described in detail below.

Figure 19:
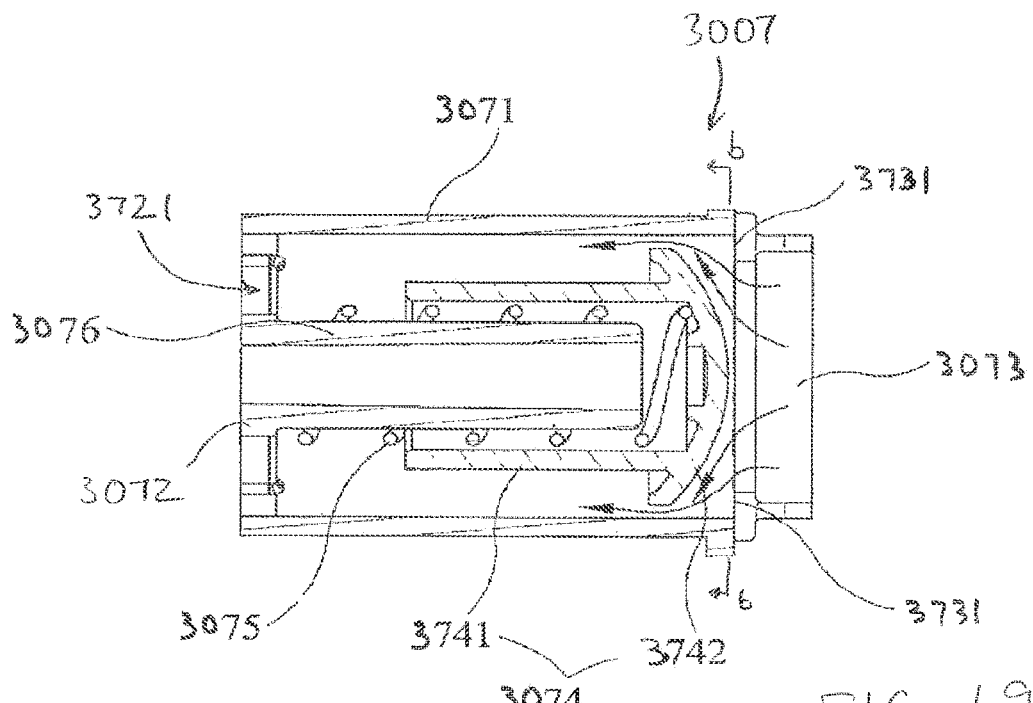
FIG. 19 is a side elevation, cross-sectional view of a portion of the combination treatment assembly shown in FIG. 18, illustrating a flow control valve in a restricted position.
Figure 20:
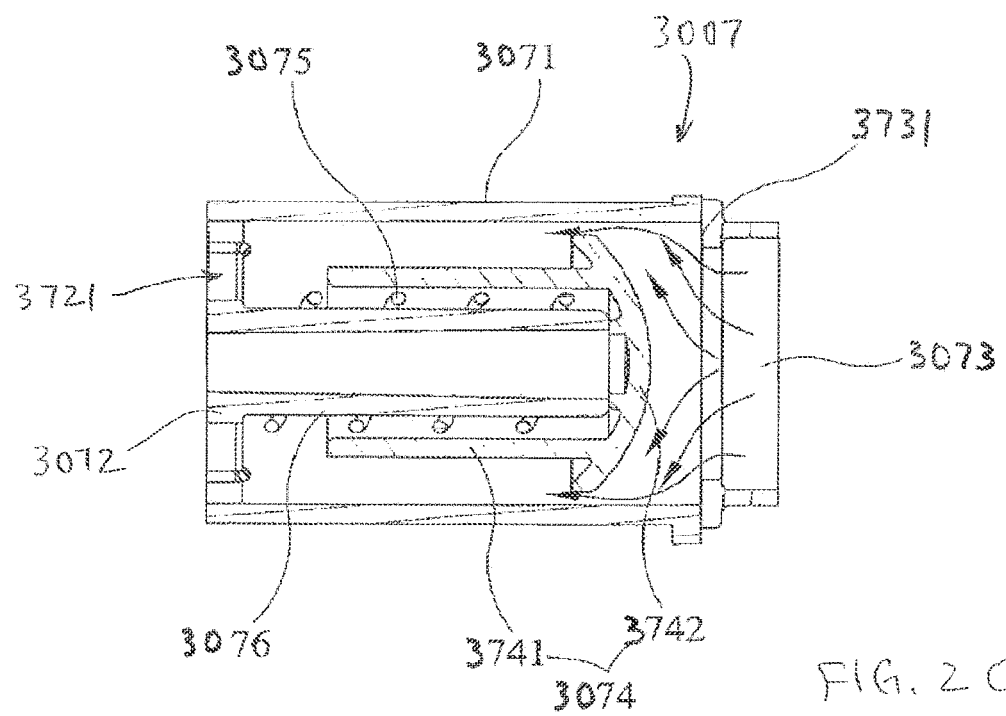
FIG. 20 is another side elevation, cross-sectional view of a portion of the combination treatment assembly shown in FIG. 18, illustrating a flow control valve in an open position.
Figure 21:
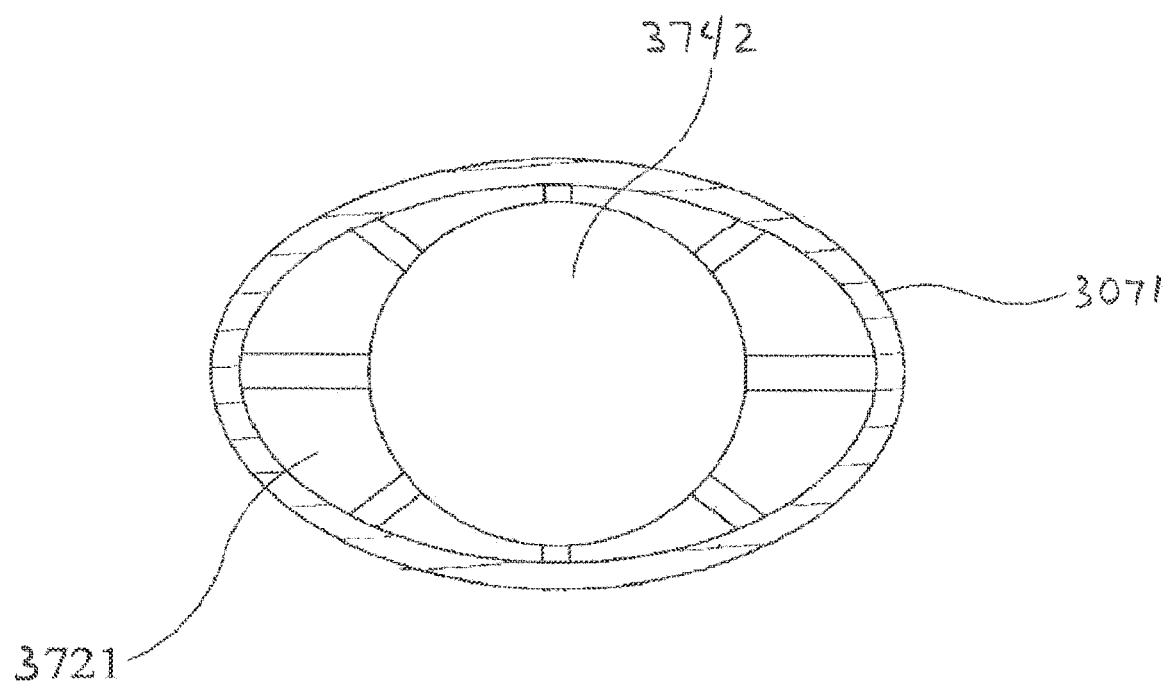
FIG. 21 is an elevation cross-section view of the flow control valve shown in FIG. 19, taken along line b-b of FIG. 19.

Referring now to FIGS. 19 and 20, a detailed view of regulating valve 3007 is shown. As illustrated, valve 3007 includes a valve body 3071 with base 3072 at an outlet end thereof, with a fluid outlet 3721 formed between the base 3072 and the valve body 3071. A limit block 3073 is connected to the opposing inlet end of valve body 3071, and cooperates with a valve 3074. The valve 3074 is disposed within valve body 3071 to selectively permit or restrict flow through regulating valve 3007 as further described below. In an exemplary embodiment illustrated in FIG. 21, valve body 3071 has an elliptical shape to generally conform to the shape of flow passageway 3011, while valve end cap 3742 and the associated valve seat 3731 are round as illustrated.

In particular, valve 3074 includes a longitudinal connecting portion 3741 having an arched, rounded end cap 3742 disposed at the upstream end thereof. The inner diameter of the limit block 3073 is smaller than that of the valve body 3071, with a valve seat 3731 formed as a stepped-down portion of block 3073 and configured to interact with end cap 3742 of valve body 3071 to regulate fluid flow through valve 3007. Under normal operating conditions, the end cap 3742 is biased toward the valve seat 3731 to form a restricted valve configuration as seen in FIG. 19.

Spring 3075 is coiled between, and acts mutually upon, base 3072 and valve 3074. Base 3072 is fixed, such that valve 3074 is biased toward the constricted valve configuration of FIG. 19 by spring 3075. Base 3072 includes guide post 3076 extending longitudinally through valve body 3071, the outer periphery of which is sheathed with spring 3075. Valve 3074 includes a generally tubular connecting portion 3741 received over the outer periphery of guide post 3076 and spring 3075, as best seen in FIGS. 19 and 20, such that a majority of spring 3075 is radially captured between guide post 3076 and connecting portion 3741. In the illustrated embodiment, spring 3075 is a compression-type coil spring, though it is contemplated that other elastic members may be used.

When the combination treatment assembly 3001 receives a flow of water from an upstream pump (not shown), particularly where the pump has a large flow capacity, a large flow of water may be presented to fluid inlet 3002. Valve 3074 of the flow regulating valve 3007 is subjected to a downstream-directed force by the impact of the incoming flow, and this force is proportional to the water pressure provided by the upstream water pump. This force acts to compress spring 3075, thereby opening valve 3074 to the high-flow configuration shown in FIG. 20. This allows an increased flow through the first fluid passageway 3011, and the remainder of the incoming flow passes through the second fluid passageway 3012.

Conversely, in the case of an upstream pump that provides relatively low water pressure, valve 3074 is subjected to a relatively small impact force from the incoming water flow. Spring 3075 will maintain valve 3074 nearer to a restricted-flow configuration as shown in FIG. 19, thereby ensuring that a larger proportion of the incoming flow is delivered to the second fluid passageway 3012 as compared to the FIG. 20 configuration described above.

In this way, an adequate flow of water through the second fluid passageway 3012 to produce the desired vacuum effect at venturi structure 3012A, 312B is ensured through a wide range of potential upstream water pressures. This, in turn, ensures that ozone or disinfectant is continuously drawn into the second fluid passageway 3012 and mixed with the water therein. This disinfected water then mixes with the water flow from the first fluid passageway 3011 in the mixing chamber 3015 and finally flows out of the combination treatment assembly 3001 via outlet 3003, to be delivered to the downstream pool for disinfection of the larger body of water.

Similar to combination treatment assembly 2001 described above, combination treatment assembly 3001 includes a flow rate monitoring switch 3005 disposed in first fluid passageway 3011 as shown in FIGS. 17 and 18. This flow rate monitoring switch 3005 may be connected to ozone generator 3 and/or the electrolytic chlorine generator (e.g. electrode 3004) such that a flow in first fluid passageway 3011 that is unable to pivot flapper 3006 upwardly toward switch 3008 will deactivate the corresponding component.

Monitoring switch 3005 may act to protect electrode 3004 in the same manner discussed above with respect to monitoring switch 2005 and titanium plate 2004. In addition, using switch 3005 to deactivate ozone generator 3 may ensure that ozone is not presented to suction inlet 3013 (FIG. 16) except when a vacuum effect can be produced in venturi structure 3012A, 3012B by adequate flow through the second passageway 3012. If the fluid flow is does not meet a predetermined threshold for production of an adequate venturi effect, the upstream electrolytic chlorine generator and/or ozone generator 3 may be deactivated unless and until such predetermined threshold is met.

4. Insulated Electrolytic Chlorine Generator

Turning now to FIGS. 22-27, another electrolytic chlorine generator suitable for use in connection with ozone generator 3 of water treatment system 10, or as a stand-alone unit, is electrolytic chlorine generator 4010 having a body 4001 with insulated electrode plate assembly 4002 contained therein.

Figure 23:
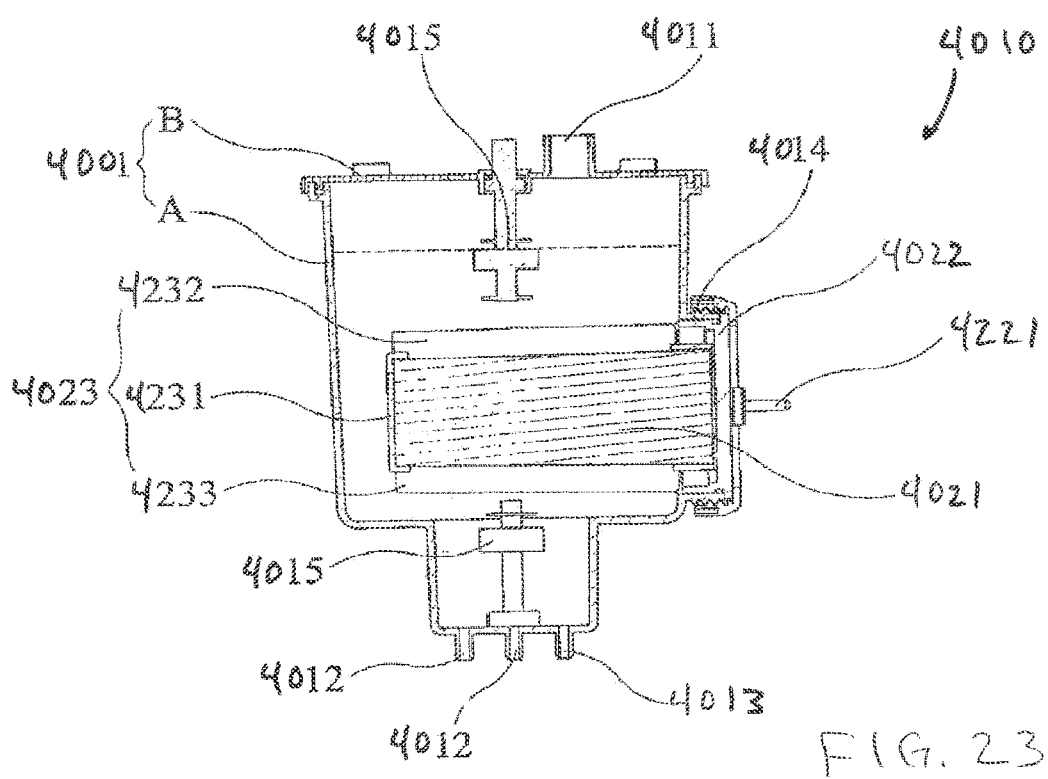
FIG. 23 is a side elevation, cross-sectional view of the electrolytic chlorine generator shown in FIG. 22.
Figure 26:
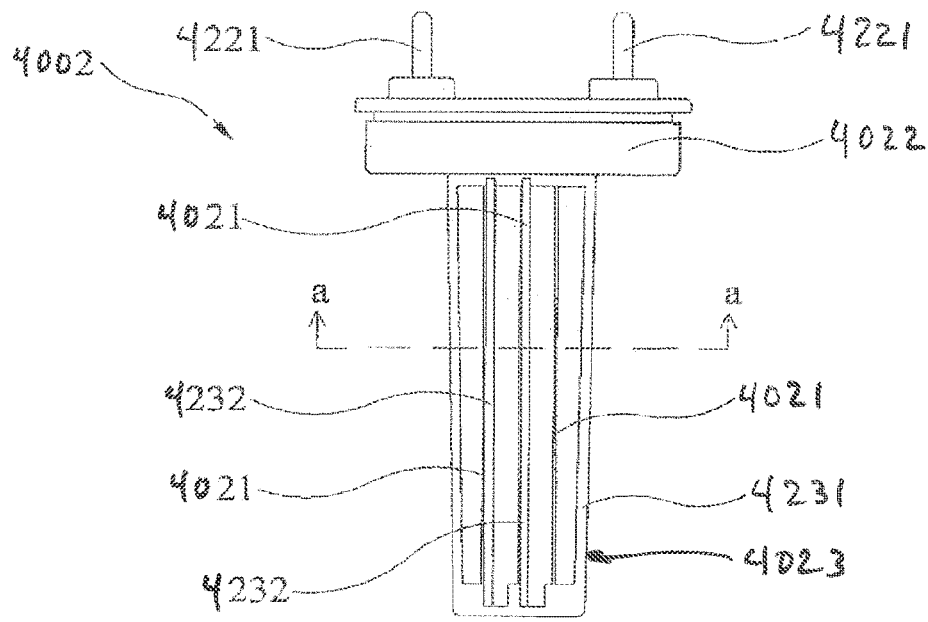
FIG. 26 is a side elevation view of the insulated electrode assembly of FIG. 25.
Figure 27:
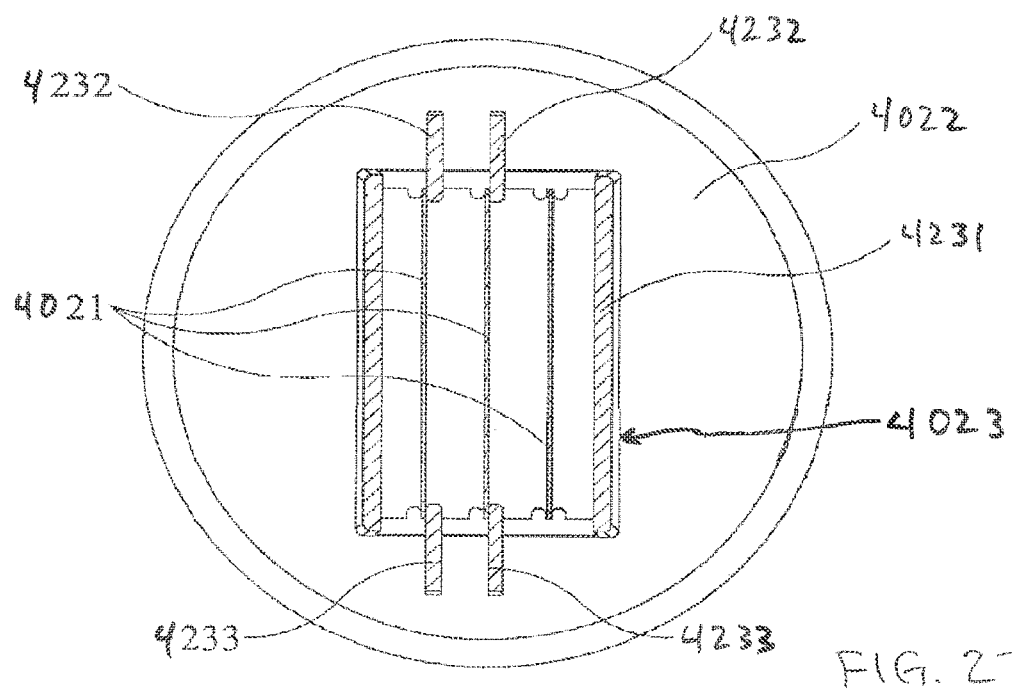
FIG. 27 is a plan, cross-section view of the insulated electrode assembly of FIG. 25, taken along line a-a of FIG. 26.

As best seen in FIGS. 23 and 26-27, insulated electrode plate assembly 4002 includes one or more electrode plates 4021 (illustratively, three plates 4021 as best seen in FIG. 27) located in the body 4001 and mounted to an insulating base 4022 fixed to body 4001. Where multiple electrode plates 4021 are employed as shown, the plates 4021 are arranged and fixed side by side on the insulating base 4022. One of the two adjacent electrode plates 4021 is close to the side edge of the other electrode plate 4021 and contacts an insulating assembly 4023 (FIG. 23) protruding out from the side edge of the other electrode plate 4021. Insulating assembly 4023 is, in turn, connected to the insulating base 4022. This arrangement poses a barrier to the formation of an electrical connection between the edges of two adjacent electrode plates 4021 through the insulating assembly 4023, such that current leakage can be avoided at the edges of the adjacent electrode plates 4021. Reduced current leakage results in a concomitantly reduced loss of electrolysis and thus increased electrolysis efficiency.

Figure 22:
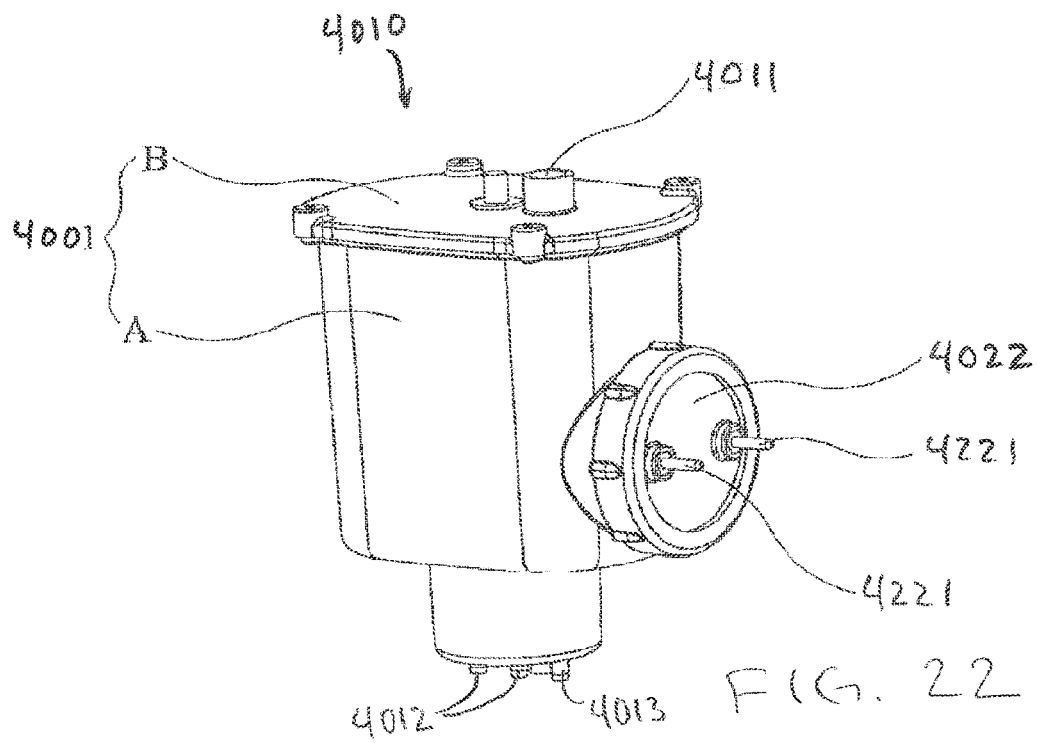
FIG. 22 is a perspective view of an electrolytic chlorine generator made in accordance with the present disclosure.

Referring to FIG. 22, body 4001 is formed by the combination of a generally bucket-shaped portion A and having a lid B fitted to the open upper end thereof. A vent aperture 4011 is provided for discharging hydrogen via the top of tank body 4001. One or more fluid inlets 4012 allow for fluid (e.g., salt water) inflow and fluid outlet 4013 allows for discharging sodium hypochlorite solution at the bottom of body 4001. In the illustrated embodiment, two fluid inlets 4012 are provided, which allows for the inflow of saturated salt water and fresh water respectively.

Figure 24:
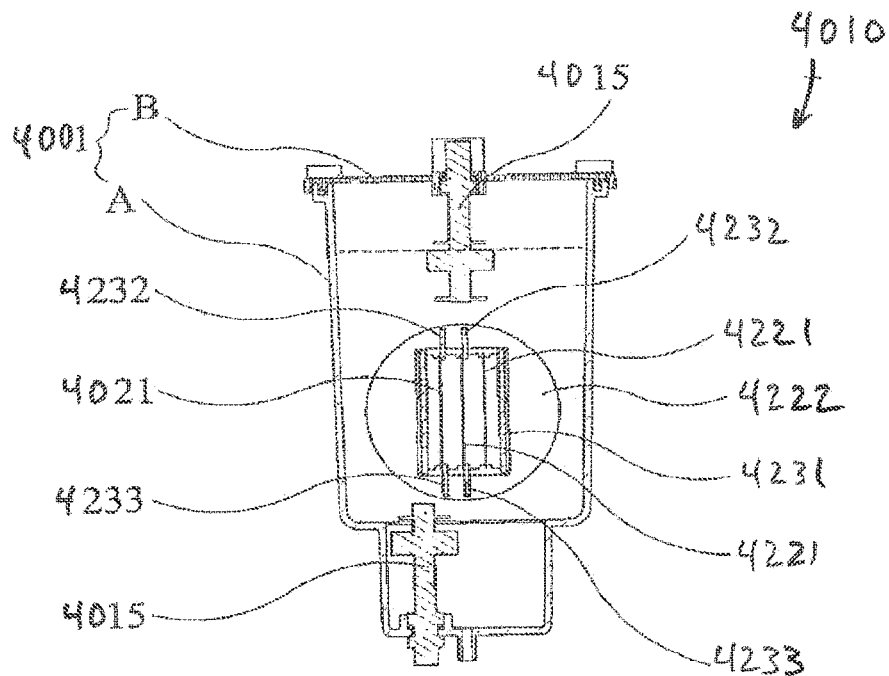
FIG. 24 is another side elevation, cross-sectional view of the electrolytic chlorine generator shown in FIG. 22.

By controlling the respective saturated- and fresh-water inflows of the respective fluid inlets 4012, the salt concentration of the fluid contained inside body 4001 can be controlled, thus the solubility of the sodium hypochlorite solution produced by electrolysis can also be controlled. As shown in FIGS. 23 and 24, two float switches 4015 corresponding to two different water levels may be provided in body 4001 in order to facilitate the control over the respective fluid flows to each fluid inlet 4012.

Referring to FIG. 23, a mounting hole 4014 is formed in the side wall of body 4001 which is sized to receive the insulating base 4022. Base 4022 can be fixed in the mounting hole 4014 together with plates 4021 and insulating assembly 4023, as illustrated. Insulating base 4022 further includes a terminal post 4221 electrically connected to each electrode plate 4021 to supply power to the electrode plate 4021. In an exemplary embodiment, electrode plates 4021 are made of titanium, similar to plates 2004 and 3004 described in detail above, to prevent corrosion and facilitate electrolysis. Moreover, plates 2004 and 3004 described above may be formed using the same principles of insulation and modular mounting described herein with respect to electrolytic chlorine generator 4010.

Figure 25:
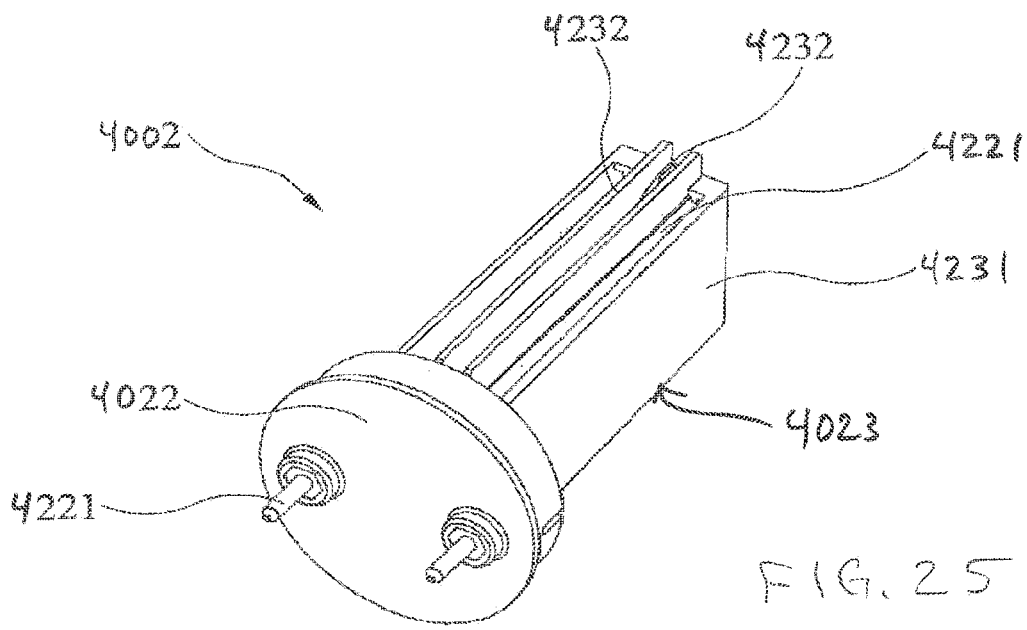
FIG. 25 is a perspective view of an insulated electrode assembly of the electrolytic chlorine generator shown in FIG. 22.

With reference to FIGS. 25-27, insulating assembly 4023 includes an insulating frame 4231, at least one upper insulating separator 4232 and at least one lower insulating separator 4233 (FIG. 27). Insulating frame 4231 is fixed to the insulating base 4022. A plurality of slots, best shown in FIG. 27, are provided at the inner surfaces of the front and back walls of frame 4231. These slots allow electrode plates 4021 to be vertically inserted (i.e., along a top-to-bottom direction from the perspective of FIGS. 25 and 27) into the insulating frame 4231, such that the each plate 4021 is held at a distance from the adjacent plate(s) 4231.

The upper and lower edges of adjacent electrode plates 4021 are further electrically isolated by upper insulating separator 4232 and a lower insulating separator 4233, respectively. The front and back ends of upper insulating separators 4232 are respectively connected to the front and back walls of the upper portion of insulating frame 4231, such that the upper edges of upper insulating separators 4232 upwardly protrude away from the upper edge of the adjacent electrode plate 4021. Similarly, the front and back ends of lower insulating separator 4233 are respectively connected to the front and back walls of at the lower portion of insulating frame 4231, such that the lower edge of lower insulating separator 4233 protrudes downwardly away from the lower edge of the adjacent electrode plate 4021. In this configuration, adjacent edges of electrode plates 4021 can be physically close one another, but shielded from one another by the insulating assembly 4023 via insulating frame 4231, upper insulating separator 4232 and lower insulating separator 4233.

In the illustrated embodiment, three electrode plates 4021 are included in electrolytic chlorine generator 4010, and fixed in position relative to one another by insulating frame 4231. With reference to FIG. 27, the left and right sides of the three electrode plates 4021 are mutually opposite to, and facing each other. In this configuration, the left plate 4021 may be the first anode plate, the middle plate 4021 may be the cathode plate, and right plate 4021 may be the second anode plate. This arrangement of plates 4021 allows for a high throughput of salt water and production of sodium hypochlorite. Further, the upper insulating separators 4232 and the lower insulating separator 4233 may be arranged such that the upper and lower edges of the right side of the (left-most) first anode plate 4021 are respectively in contact with the left pair of upper and lower insulating separators 4232 and 4233. In addition, the upper and lower edges of the right side of the (middle) cathode plate 4021 are respectively in contact with the right pair of upper and lower insulating separators 4232 and 4233. In this arrangement, the (right-most) second anode plate 4021 need not be in direct contact with any of the upper and lower insulating separators 4232 and 4233. This arrangement provides effective electrical insulation between the respective plates 4021.

Alternatively, the respective left sides of the (middle) cathode plate 4021 and the (right-most) second anode plate 4021 may be contacted at their upper and lower edges by respective pairs of upper and lower insulating separators 4232 and 4233. In this arrangement, the (left-most) first anode plate 4021 need not be in direct contact with any of the upper and lower insulating separators 4232 and 4233. This alternative arrangement will also product effective electrical insulation between the respective plates 4021.

The insulation arrangement provided by electrolytic chlorine generator 4010 allows for efficient generation of sodium hypochlorite by mitigating or eliminating current leakage among the electrode plates 4021. In the absence of such current leakage, the efficiency of the electrolysis process is improved such that sodium hypochlorite may be produced with a minimal power input.

The foregoing sections have provided disclosure of various elements of a common water treatment design, including a modularly replaceable ozone generator, a float-based valve which protects against water backflow from a pool to an ozone generator element, an electrolytic chlorine generator that generates sodium hypochlorite for water treatment, and a set of combination treatment assemblies that allow ozone and sodium hypochlorite to be efficiently combined in the process of treating water with both treatment modalities. Any and all of the foregoing features may be combined into a single design, such as water treatment system 10, or any selected subset of the foregoing features may be combined as required or desired for a particular application. Moreover, it is contemplated that some features of the foregoing designs may be used in conjunction with traditional designs, for example, the float-based valve of FIGS. 5-12 may be combined with a traditional ozone generator, any of the flow assemblies may be combined with traditional electrolytic chlorine generator and/or traditional ozone generators, and any other like combinations of traditional and inventive features may be made.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A water treatment system configured for use with a pool, the water treatment system comprising:
    an electrolytic chlorine generator;
    an ozone generator; and
    a treatment assembly including a tube-shaped tank, comprising:
        a first fluid passageway including the electrolytic chlorine generator;
        a second fluid passageway including a venturi structure with a suction inlet configured to receive ozone gas from the ozone generator;
        a fluid inlet in communication with the first and second fluid passageways; and
        a fluid outlet in communication with the first and second fluid passageways.

2. The water treatment system of claim 1, further comprising a mixing chamber positioned downstream of the electrolytic chlorine generator and the ozone generator and positioned upstream of the fluid outlet.

3. The water treatment system of claim 1, wherein the first fluid passageway includes a flow rate monitor configured to activate the electrolytic chlorine generator with a sufficient fluid flow through the first fluid passageway and deactivate the electrolytic chlorine generator with an insufficient fluid flow through the first fluid passageway.

4. The water treatment system of claim 3, further comprising a switch operatively coupled to a pivot flapper disposed along the first fluid passageway to monitor a flow rate within the first fluid passageway.

5. The water treatment system of claim 4, wherein with a sufficient flow of fluid through the first passageway the switch activates the electrolytic chlorine generator.

6. The water treatment system of claim 5, wherein the pivot flapper pivots toward the switch to cause the switch to activate the electrolytic chlorine generator.

7. The water treatment system of claim 6, wherein with an insufficient flow of fluid through the first passageway, the pivot flapper is unable to pivot toward the switch, so the electrolytic chlorine generator is deactivated.

8. The water treatment system of claim 1, wherein the first fluid passageway includes a flow restrictor configured to divert flow to the second fluid passageway.

9. The water treatment system of claim 8, wherein the flow restrictor is disposed at an upstream end of the first fluid passageway relative to the electrolytic chlorine generator.

10. The water treatment system of claim 9, wherein the flow restrictor comprises:
    a valve body with an inlet end and an outlet end;
    a base disposed at the outlet end of the valve body;
    a fluid outlet formed between the base and the valve body;
    a valve disposed within the valve body and cooperating with the valve body to selectively permit or restrict flow through the valve; and
    a spring operatively coupled to the valve to bias the valve towards a closed position relative to the valve body.

11. The water treatment system of claim 10, wherein the valve includes a longitudinal connecting portion having an end cap at an upstream end, and the flow restrictor further includes a limit block having an inner diameter smaller than that of the valve body, with a valve seat formed as a stepped-down portion of the limit block and configured to interact with the end cap of the valve body to regulate fluid flow through the valve.

12. The water treatment system of claim 1, further comprising a housing that supports the electrolytic chlorine generator and the ozone generator, wherein the ozone generator is removably coupled to the housing.

13. The water treatment system of claim 1, wherein the electrolytic chlorine generator includes electrode plates.

14. The water treatment system of claim 13, wherein the electrode plates are titanium electrode plates.

15. The water treatment system of claim 14, further comprising a retainer disposed within the first fluid passageway, the retainer retaining the titanium electrode plates and having a plurality of apertures to allow fluid contact with the titanium electrode plates.

16. The water treatment system of claim 1, wherein the electrolytic chlorine generator and the venturi structure are combined into a single unit.

17. A water treatment system configured for use with a pool, the water treatment system comprising:
  a housing defining a chamber, the chamber having a fluid inlet and a fluid outlet;
  a fluid flow monitor disposed within the housing along a first direction relative to the fluid inlet; and
  a treatment electrode disposed along the first direction relative to the fluid flow monitor, wherein the fluid flow monitor comprises a pivot flapper positioned proximate the fluid inlet and distal the fluid outlet.

18. The water treatment system of claim 17, wherein a fluid passes from the fluid inlet to the fluid outlet along the first direction.

19. The water treatment system of claim 17, wherein the pivot flapper includes a pivot configuration wherein the pivot flapper pivots toward the fluid flow monitor in response to a sufficient fluid flow through the first fluid passageway, and a rest configuration wherein the pivot flapper pivots away from the fluid flow monitor in response to an insufficient fluid flow through the first fluid passageway.

20. The water treatment system of claim 19, wherein, in the pivot configuration, the treatment electrode is activated, and wherein, in the rest configuration, the treatment electrode is deactivated.

* * * * *